United States Patent
Amirsolaimani et al.

(10) Patent No.: US 11,366,298 B1
(45) Date of Patent: Jun. 21, 2022

(54) EYE TRACKING BASED ON TELECENTRIC POLARIZATION SENSITIVE GRATING

(71) Applicant: Facebook Technologies, LLC, Menlo Park, CA (US)

(72) Inventors: Babak Amirsolaimani, Redmond, WA (US); Yun-Han Lee, Redmond, WA (US); Robin Sharma, Redmond, WA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 342 days.

(21) Appl. No.: 16/535,794

(22) Filed: Aug. 8, 2019

Related U.S. Application Data

(60) Provisional application No. 62/804,126, filed on Feb. 11, 2019.

(51) Int. Cl.
  *G02B 17/08* (2006.01)
  *G02B 27/28* (2006.01)
  (Continued)

(52) U.S. Cl.
  CPC ..... *G02B 17/0856* (2013.01); *G02B 27/0172* (2013.01); *G02B 27/1006* (2013.01);
  (Continued)

(58) Field of Classification Search
  CPC ............ G02B 17/0856; G02B 27/0172; G02B 27/1006; G02B 27/283; G02B 2027/0138; G02B 27/0093; G06F 3/013
  See application file for complete search history.

(56) References Cited

U.S. PATENT DOCUMENTS

| 9,250,373 | B2 | 2/2016 | Kubota |
| 9,377,623 | B2 | 6/2016 | Robbins et al. |

(Continued)

FOREIGN PATENT DOCUMENTS

WO 2017134412 A1 8/2017

OTHER PUBLICATIONS

Bigler C.M., et al., "Holographic Waveguide Heads-Up Display for Longitudinal Image Magnification and Pupil Expansion," Mar. 20, 2018, vol. 57 (9), pp. 1-7.
(Continued)

*Primary Examiner* — Collin X Beatty
(74) *Attorney, Agent, or Firm* — Morgan, Lewis & Bockius LLP

(57) ABSTRACT

A telecentric optical element that has a first surface, a second surface, and a layer of optically anisotropic material between the first surface and the second surface. The telecentric optical element is configured to receive light on the first surface, the light having propagated from a location within a predetermined distance range from the first surface of the optical element. The telecentric optical element is also configured to redirect a first portion of the light, having a first polarization, off the first surface of the telecentric optical element in an off-axis direction, and to transmit a second portion of light, having polarization different from the first polarization, to the second surface. An eye-tracking assembly that includes the telecentric optical element and a display device that includes the telecentric optical element are also disclosed.

19 Claims, 18 Drawing Sheets

(51) Int. Cl.
  *G02B 27/01* (2006.01)
  *G06F 3/01* (2006.01)
  *G02B 27/10* (2006.01)
(52) U.S. Cl.
  CPC ........... *G02B 27/283* (2013.01); *G06F 3/013* (2013.01); *G02B 2027/0138* (2013.01)

(56) References Cited

U.S. PATENT DOCUMENTS

| | | |
|---|---|---|
| 2010/0134534 A1 | 6/2010 | Seesselberg et al. |
| 2011/0292321 A1 | 12/2011 | Travis et al. |
| 2012/0236030 A1 | 9/2012 | Border et al. |
| 2013/0108229 A1 | 5/2013 | Starner et al. |
| 2017/0039905 A1 | 2/2017 | Jepsen et al. |
| 2018/0113303 A1 | 4/2018 | Popovich et al. |
| 2018/0120563 A1 | 5/2018 | Kollin et al. |
| 2018/0203505 A1* | 7/2018 | Trail ................. G02B 27/0093 |
| 2019/0369719 A1* | 12/2019 | Klingstrom ........ G02B 27/0179 |

OTHER PUBLICATIONS

Extended European Search Report for European Application No. 19803933.1, dated Jun. 30, 2021, 7 pages.
Hu X., et al., "Optical Design of an Eyetracked Head-Mounted Display Using Freeform Waveguide," Classical Optics, Jun. 2014, 3 Pages, Retrieved from the Internet: URL: https://www.researchgate.net/publication/263819328_Optical_Design_of_An_Eyetracked_Head-mounted_Display_using_Freeform_Waveguide.
International Preliminary Report Patentability for International Application No. PCT/US2019/028452, dated Dec. 3, 2020, 8 Pages.
International Search Report and Written Opinion for International Application No. PCT/US2019/028452, dated Aug. 30, 2019, 10 Pages.

\* cited by examiner

EYE TRACKING BASED ON TELECENTRIC POLARIZATION SENSITIVE GRATING

RELATED APPLICATION

This application claims the benefit of, and priority to, U.S. Provisional Patent Application Ser. No. 62/804,126, filed on Feb. 11, 2019, which is incorporated by reference herein in its entirety.

TECHNICAL FIELD

This relates generally to display devices, and more specifically to head-mounted display devices.

BACKGROUND

Head-mounted display devices (also called herein head-mounted displays) are gaining popularity as means for providing visual information to a user. For example, the head-mounted display devices are used for virtual reality and augmented reality operations.

When operating head mounted displays, it can be desirable to track an eye of a user in order to direct images toward the user's eyes. In most cases, a magnification of the eye, as imaged by the eye-tracking assembly, is based on the distance between the eye and an optical element of the eye-tracking assembly. Variations in the size of the image of the eye may reduce the eye-tracking assembly's accuracy in determining a position of a pupil of the eye and/or a gaze direction of the eye.

SUMMARY

Accordingly, there is a need for an eye-tracking assembly that can provide a constant magnification of a user's eye regardless of the distance between the user's eye and an optical element of the eye-tracking assembly.

The above deficiencies and other problems associated with conventional head-mounted displays are reduced or eliminated by the disclosed display devices.

An eye-tracking assembly, according to certain embodiments, is light-weight, compact, and includes a polarization sensitive hologram (also referred to herein as PSH) that allows for constant optical power regardless of the distance between the eye and an optical element of the eye-tracking assembly. The PSH transmits light from a display so that the user can view images from the display. In some embodiments, the PSH also transmits eye-tracking light so that the eye-tracking light output from an illumination source can illuminate the eye(s) of the user. The PSH focuses at least a portion of eye-tracking light that is reflected off the eye of the user to a camera or detector at a constant optical power regardless of the distance between the eye and an optical element of the eye-tracking assembly. Thus, images captured by the eye-tracking assembly have a constant magnification.

In accordance with some embodiments, an optical element has a first surface, a second surface opposite the first surface, and a layer of optically anisotropic material between the first surface and the second surface. The optical element is configured to receive light that has propagated from a first location having a first distance from the first surface of the optical element. The optical element is also configured to redirect a first portion of the light off the first surface of the optical element in an off-axis direction that is non-parallel and non-perpendicular to an optical axis of the optical element. The first portion of the light has a first polarization and wavelengths in a predetermined wavelength range. The first portion of the light impinges on the first surface of the optical element with incident angles in a first predetermined angular range. The optical element is also configured to transmit a second portion of the light to the second surface. The second portion of the light includes at least one of: light having polarization that is different from the first polarization, light having wavelengths outside the predetermined wavelength range, or light having incident angles outside the first predetermined angular range.

In some embodiments, the optical element is configured to allow the first distance to be any distance within a predetermined distance range.

In accordance with some embodiments, an eye-tracker for determining a position of a pupil of an eye or a gaze direction of the eye includes a first optical element and a detector. The first optical element has a first surface, a second surface opposite to the first surface, and a first layer of optically anisotropic material between the first surface and the second surface. The detector is disposed to face the first surface of the first optical element at an angle. The first optical element is configured to receive on the first surface of the first optical element first light that has propagated from a first location having a first distance from the first surface of the first optical element. The first optical element is also configured to redirect a first portion of the first light off the first surface of the first optical element in a first direction toward the detector and transmit a second portion of the first light to the second surface of the first optical element. The first portion of the first light has a first polarization and wavelengths in a predetermined wavelength range. The first portion of the first light impinges on the first surface of the first optical element with incident angles in a first predetermined angular range. The second portion of the first light includes at least one of: light having polarization that is different from the first polarization; light having wavelengths outside the predetermined wavelength range; or light having incident angles, on the first surface of the first optical element, outside the first predetermined angular range.

In accordance with some embodiments, a method for determining a position of a pupil of an eye or a gaze direction of the eye includes receiving, at a first surface located within a predetermined distance from the eye, first light reflected off the eye. The method also includes redirecting a first portion of the first light toward a detector that is disposed to face the first surface at a first angle. The first portion of the first light has a first polarization and wavelengths in a predetermined wavelength range. The first portion of the first light impinges on the first surface of the first optical element with incident angles in a first predetermined angular range. At least a subset of the first portion of the first light is received by the detector and forms a first image of the eye in the detector. The method further includes transmitting a second portion of the first light from the first surface toward a second surface opposite the first surface. The second portion of the first light includes at least one: light having polarization that is different from the first polarization, light having wavelengths outside the predetermined wavelength range, and light having incident angles outside the first predetermined angular range.

Thus, the disclosed embodiments provide an eye-tracking assembly that has a constant magnification regardless of the distance between an optical element of the eye-tracking assembly and an eye of a user.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

Figure 1:
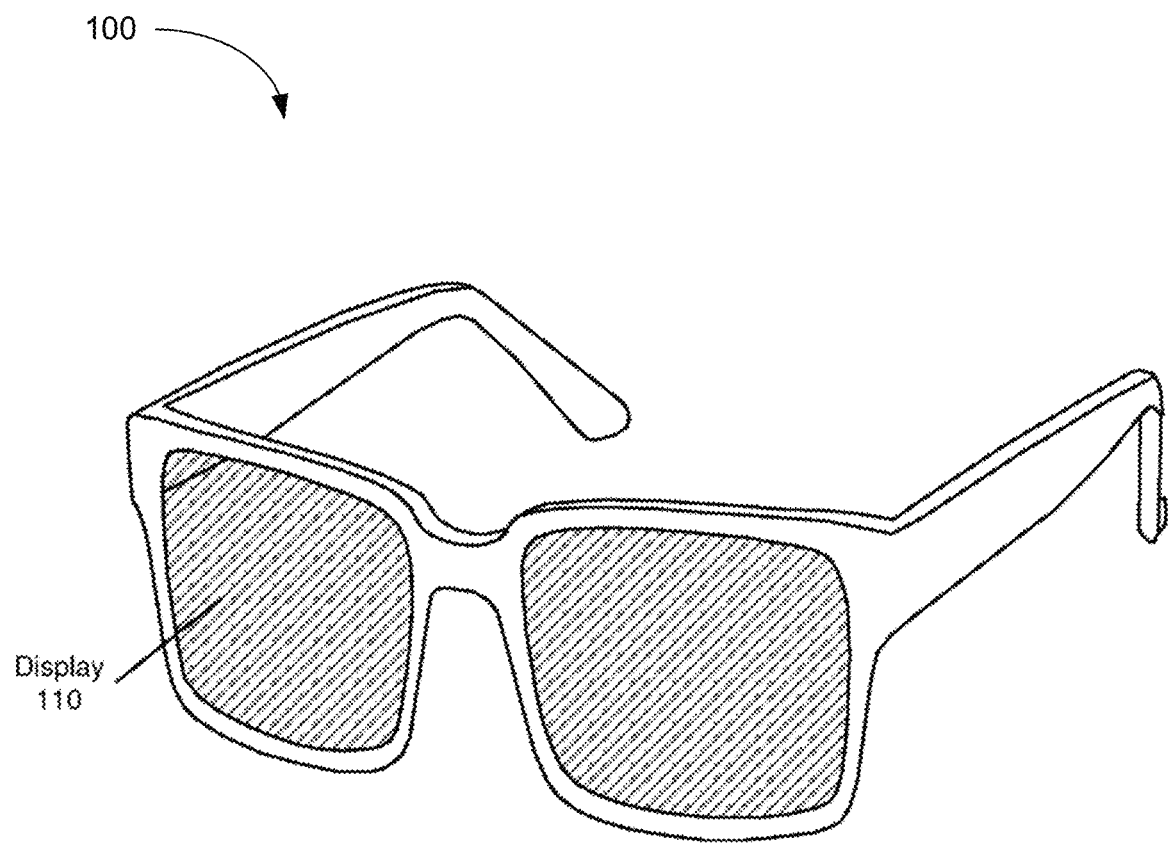
FIG. 1 is a perspective view of a display device in accordance with some embodiments.

These figures are not drawn to scale unless indicated otherwise.

DETAILED DESCRIPTION

The present disclosure provides an eye-tracking assembly in a display device that includes a telecentric polarization sensitive hologram (PSH). The eye-tracking assembly allows the distance between the PSH and an eye to be varied while keeping the size of an image of the eye about the same. In other words, the eye-tracking assembly is configured to redirect and focus certain light reflected off the eye towards a detector or camera at a certain magnification and/or optical power, allowing the size of an image of the eye in the eye-tracking assembly to remain substantially constant regardless of the distance between the eye and an optical element of the eye-tracking assembly. Further, the eye-tracking assembly is configured to be placed in front of the user's eyes without obstructing the user's view of an image displayed by the display device. In some embodiments, a light source for providing eye-tracking light is also included. A head-mounted display device that includes a display system and the eye-tracking assembly is disclosed herein. A method of determining a position of a pupil of an eye is also disclosed herein.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first light projector could be termed a second light projector, and, similarly, a second light projector could be termed a first light projector, without departing from the scope of the various described embodiments. The first light projector and the second light projector are both light projectors, but they are not the same light projector.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

FIG. 1 illustrates display device 100 in accordance with some embodiments. In some embodiments, display device 100 is configured to be worn on a head of a user (e.g., by having the form of spectacles or eyeglasses, as shown in FIG. 1) or to be included as part of a helmet that is to be worn by the user. When display device 100 is configured to be worn on a head of a user or to be included as part of a helmet, display device 100 is called a head-mounted display. Alternatively, display device 100 is configured for placement in proximity of an eye or eyes of the user at a fixed location, without being head-mounted (e.g., display device 100 is mounted in a vehicle, such as a car or an airplane, for placement in front of an eye or eyes of the user). As shown in FIG. 1, display device 100 includes display 110. Display 110 is configured for presenting visual contents (e.g., augmented reality contents, virtual reality contents, mixed reality contents, or any combination thereof) to a user.

Figure 2:
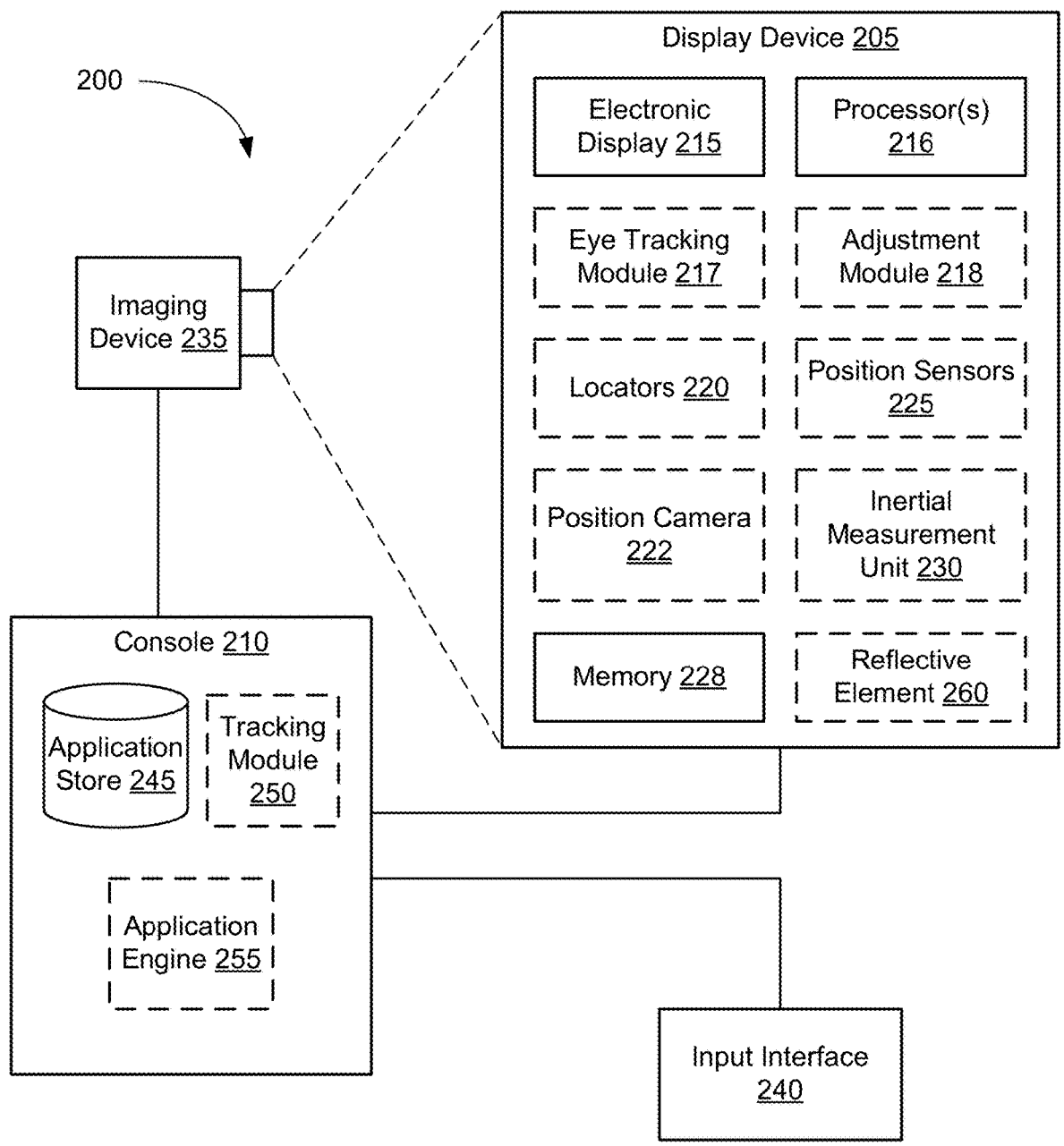
FIG. 2 is a block diagram of a system including a display device in accordance with some embodiments.

In some embodiments, display device 100 includes one or more components described herein with respect to FIG. 2. In some embodiments, display device 100 includes additional components not shown in FIG. 2.

FIG. 2 is a block diagram of system 200 in accordance with some embodiments. The system 200 shown in FIG. 2 includes display device 205 (which corresponds to display device 100 shown in FIG. 1), imaging device 235, and input interface 240 that are each coupled to console 210. While FIG. 2 shows an example of system 200 including one display device 205, imaging device 235, and input interface 240, in other embodiments, any number of these components may be included in system 200. For example, there may be multiple display devices 205 each having associated input interface 240 and being monitored by one or more imaging devices 235, with each display device 205, input interface 240, and imaging devices 235 communicating with console 210. In alternative configurations, different and/or additional components may be included in system 200. For example, in some embodiments, console 210 is connected via a network (e.g., the Internet) to system 200 or is self-contained as part of display device 205 (e.g., physically located inside display device 205). In some embodiments, display device 205 is used to create mixed reality by adding in a view of the real surroundings. Thus, display device 205 and system 200 described here can deliver augmented reality, virtual reality, and mixed reality.

In some embodiments, as shown in FIG. 1, display device 205 is a head-mounted display that presents media to a user. Examples of media presented by display device 205 include one or more images, video, audio, or some combination thereof. In some embodiments, audio is presented via an external device (e.g., speakers and/or headphones) that receives audio information from display device 205, console 210, or both, and presents audio data based on the audio information. In some embodiments, display device 205 immerses a user in an augmented environment.

In some embodiments, display device 205 also acts as an augmented reality (AR) headset. In these embodiments, display device 205 augments views of a physical, real-world environment with computer-generated elements (e.g., images, video, sound, etc.). Moreover, in some embodiments, display device 205 is able to cycle between different types of operation. Thus, display device 205 operate as a virtual reality (VR) device, an augmented reality (AR) device, as glasses or some combination thereof (e.g., glasses with no optical correction, glasses optically corrected for the user, sunglasses, or some combination thereof) based on instructions from application engine 255.

Display device 205 includes electronic display 215, one or more processors 216, eye tracking module 217, adjustment module 218, one or more locators 220, one or more position sensors 225, one or more position cameras 222, memory 228, inertial measurement unit (IMU) 230, one or more reflective elements 260 or a subset or superset thereof (e.g., display device 205 with electronic display 215, one or more processors 216, and memory 228, without any other listed components). Some embodiments of display device 205 have different modules than those described here. Similarly, the functions can be distributed among the modules in a different manner than is described here.

One or more processors 216 (e.g., processing units or cores) execute instructions stored in memory 228. Memory 228 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 228, or alternately the non-volatile memory device(s) within memory 228, includes a non-transitory computer readable storage medium. In some embodiments, memory 228 or the computer readable storage medium of memory 228 stores programs, modules and data structures, and/or instructions for displaying one or more images on electronic display 215.

Electronic display 215 displays images to the user in accordance with data received from console 210 and/or processor(s) 216. In various embodiments, electronic display 215 may comprise a single adjustable display element or multiple adjustable display elements (e.g., a display for each eye of a user). In some embodiments, electronic display 215 is configured to display images to the user by projecting the images onto one or more reflective elements 260.

In some embodiments, the display element includes one or more light emission devices and a corresponding array of spatial light modulators. A spatial light modulator is an array of electro-optic pixels, opto-electronic pixels, some other array of devices that dynamically adjust the amount of light transmitted by each device, or some combination thereof. These pixels are placed behind one or more lenses. In some embodiments, the spatial light modulator is an array of liquid crystal based pixels in an LCD (a Liquid Crystal Display). Examples of the light emission devices include: an organic light emitting diode, an active-matrix organic light-emitting diode, a light emitting diode, some type of device capable of being placed in a flexible display, or some combination thereof. The light emission devices include devices that are capable of generating visible light (e.g., red, green, blue, etc.) used for image generation. The spatial light modulator is configured to selectively attenuate individual light emission devices, groups of light emission devices, or some combination thereof. Alternatively, when the light emission devices are configured to selectively attenuate individual emission devices and/or groups of light emission devices, the display element includes an array of such light emission devices without a separate emission intensity array. In some embodiments, electronic display 215 projects images to one or more reflective elements 260, which reflect at least a portion of the light toward an eye of a user.

One or more lenses direct light from the arrays of light emission devices (optionally through the emission intensity arrays) to locations within each eyebox and ultimately to the back of the user's retina(s). An eyebox is a region that is occupied by an eye of a user located proximity to display device 205 (e.g., a user wearing display device 205) for viewing images from display device 205. In some cases, the eyebox is represented as a 10 mm×10 mm square. In some embodiments, the one or more lenses include one or more coatings, such as anti-reflective coatings.

In some embodiments, the display element includes an infrared (IR) detector array that detects IR light that is retro-reflected from the retinas of a viewing user, from the surface of the corneas, lenses of the eyes, or some combination thereof. The IR detector array includes an IR sensor or a plurality of IR sensors that each correspond to a different position of a pupil of the viewing user's eye. In alternate embodiments, other eye tracking systems may also be employed.

Eye tracking module 217 determines locations of each pupil of a user's eyes. In some embodiments, eye tracking module 217 instructs electronic display 215 to illuminate the eyebox with IR light (e.g., via IR emission devices in the display element).

A portion of the emitted IR light will pass through the viewing user's pupil and be retro-reflected from the retina toward the IR detector array, which is used for determining the location of the pupil. Alternatively, the reflection off of the surfaces of the eye is used to also determine location of the pupil. The IR detector array scans for retro-reflection and identifies which IR emission devices are active when retro-reflection is detected. Eye tracking module 217 may use a tracking lookup table and the identified IR emission devices to determine the pupil locations for each eye. The tracking lookup table maps received signals on the IR detector array to locations (corresponding to pupil locations) in each eyebox. In some embodiments, the tracking lookup table is generated via a calibration procedure (e.g., user looks at various known reference points in an image and eye tracking module 217 maps the locations of the user's pupil while looking at the reference points to corresponding signals received on the IR tracking array). As mentioned above, in some embodiments, system 200 may use other eye tracking systems than the embedded IR one described herein.

Adjustment module 218 generates an image frame based on the determined locations of the pupils. In some embodiments, this sends a discrete image to the display that will tile subimages together thus a coherent stitched image will appear on the back of the retina. Adjustment module 218 adjusts an output (i.e. the generated image frame) of electronic display 215 based on the detected locations of the pupils. Adjustment module 218 instructs portions of electronic display 215 to pass image light to the determined locations of the pupils. In some embodiments, adjustment module 218 also instructs the electronic display to not pass image light to positions other than the determined locations of the pupils. Adjustment module 218 may, for example, block and/or stop light emission devices whose image light falls outside of the determined pupil locations, allow other light emission devices to emit image light that falls within the determined pupil locations, translate and/or rotate one or more display elements, dynamically adjust curvature and/or refractive power of one or more active lenses in the lens (e.g., microlens) arrays, or some combination thereof.

Optional locators 220 are objects located in specific positions on display device 205 relative to one another and relative to a specific reference point on display device 205. A locator 220 may be a light emitting diode (LED), a corner cube reflector, a reflective marker, a type of light source that contrasts with an environment in which display device 205 operates, or some combination thereof. In embodiments where locators 220 are active (i.e., an LED or other type of light emitting device), locators 220 may emit light in the visible band (e.g., about 400 nm to 750 nm), in the infrared band (e.g., about 750 nm to 1 mm), in the ultraviolet band (about 100 nm to 400 nm), some other portion of the electromagnetic spectrum, or some combination thereof.

In some embodiments, locators 220 are located beneath an outer surface of display device 205, which is transparent to the wavelengths of light emitted or reflected by locators 220 or is thin enough to not substantially attenuate the wavelengths of light emitted or reflected by locators 220. Additionally, in some embodiments, the outer surface or other portions of display device 205 are opaque in the visible band of wavelengths of light. Thus, locators 220 may emit light in the IR band under an outer surface that is transparent in the IR band but opaque in the visible band.

IMU 230 is an electronic device that generates calibration data based on measurement signals received from one or more position sensors 225. Position sensor 225 generates one or more measurement signals in response to motion of display device 205. Examples of position sensors 225 include: one or more accelerometers, one or more gyroscopes, one or more magnetometers, another suitable type of sensor that detects motion, a type of sensor used for error correction of IMU 230, or some combination thereof. Position sensors 225 may be located external to IMU 230, internal to IMU 230, or some combination thereof.

Based on the one or more measurement signals from one or more position sensors 225, IMU 230 generates first calibration data indicating an estimated position of display device 205 relative to an initial position of display device 205. For example, position sensors 225 include multiple accelerometers to measure translational motion (forward/back, up/down, left/right) and multiple gyroscopes to measure rotational motion (e.g., pitch, yaw, roll). In some embodiments, IMU 230 rapidly samples the measurement signals and calculates the estimated position of display device 205 from the sampled data. For example, IMU 230 integrates the measurement signals received from the accelerometers over time to estimate a velocity vector and integrates the velocity vector over time to determine an estimated position of a reference point on display device 205. Alternatively, IMU 230 provides the sampled measurement signals to console 210, which determines the first calibration data. The reference point is a point that may be used to describe the position of display device 205. While the reference point may generally be defined as a point in space; however, in practice the reference point is defined as a point within display device 205 (e.g., a center of IMU 230).

In some embodiments, IMU 230 receives one or more calibration parameters from console 210. As further discussed below, the one or more calibration parameters are used to maintain tracking of display device 205. Based on a received calibration parameter, IMU 230 may adjust one or more IMU parameters (e.g., sample rate). In some embodiments, certain calibration parameters cause IMU 230 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

Imaging device 235 generates calibration data in accordance with calibration parameters received from console 210. Calibration data includes one or more images showing observed positions of locators 220 that are detectable by imaging device 235. In some embodiments, imaging device 235 includes one or more still cameras, one or more video cameras, any other device capable of capturing images including one or more locators 220, or some combination thereof. Additionally, imaging device 235 may include one or more filters (e.g., used to increase signal to noise ratio). Imaging device 235 is configured to optionally detect light emitted or reflected from locators 220 in a field of view of imaging device 235. In embodiments where locators 220 include passive elements (e.g., a retroreflector), imaging device 235 may include a light source that illuminates some or all of locators 220, which retro-reflect the light towards the light source in imaging device 235. Second calibration data is communicated from imaging device 235 to console 210, and imaging device 235 receives one or more calibration parameters from console 210 to adjust one or more imaging parameters (e.g., focal length, focus, frame rate, ISO, sensor temperature, shutter speed, aperture, etc.).

In some embodiments, display device 205 optionally includes one or more reflective elements 260. In some embodiments, electronic display device 205 optionally includes a single reflective element 260 or multiple reflective elements 260 (e.g., a reflective element 260 for each eye of a user). In some embodiments, electronic display device 215 projects computer-generated images on one or more reflective elements 260, which, in turn, reflect the images toward an eye or eyes of a user. The computer-generated images include still images, animated images, and/or a combination thereof. The computer-generated images include objects that appear to be two-dimensional and/or three-dimensional objects. In some embodiments, one or more reflective elements 260 are partially transparent (e.g., the one or more reflective elements 260 have a transmittance of at least 15%, 20%, 25%, 30%, 35%, 40%, 45%, or 50%), which allows transmission of ambient light. In such embodiments, computer-generated images projected by electronic display 215 are superimposed with the transmitted ambient light (e.g., transmitted ambient image) to provide augmented reality images.

Input interface 240 is a device that allows a user to send action requests to console 210. An action request is a request to perform a particular action. For example, an action request may be to start or end an application or to perform a particular action within the application. Input interface 240 may include one or more input devices. Example input devices include: a keyboard, a mouse, a game controller, data from brain signals, data from other parts of the human body, or any other suitable device for receiving action requests and communicating the received action requests to console 210. An action request received by input interface 240 is communicated to console 210, which performs an action corresponding to the action request. In some embodiments, input interface 240 may provide haptic feedback to the user in accordance with instructions received from console 210. For example, haptic feedback is provided when an action request is received, or console 210 communicates instructions to input interface 240 causing input interface 240 to generate haptic feedback when console 210 performs an action.

Console 210 provides media to display device 205 for presentation to the user in accordance with information received from one or more of: imaging device 235, display device 205, and input interface 240. In the example shown in FIG. 2, console 210 includes application store 245, tracking module 250, and application engine 255. Some embodiments of console 210 have different modules than those described in conjunction with FIG. 2. Similarly, the functions further described herein may be distributed among components of console 210 in a different manner than is described here.

When application store 245 is included in console 210, application store 245 stores one or more applications for execution by console 210. An application is a group of instructions, that when executed by a processor, is used for generating content for presentation to the user. Content generated by the processor based on an application may be in response to inputs received from the user via movement of display device 205 or input interface 240. Examples of applications include: gaming applications, conferencing applications, video playback application, or other suitable applications.

When tracking module 250 is included in console 210, tracking module 250 calibrates system 200 using one or more calibration parameters and may adjust one or more calibration parameters to reduce error in determination of the position of display device 205. For example, tracking module 250 adjusts the focus of imaging device 235 to obtain a more accurate position for observed locators on display device 205. Moreover, calibration performed by tracking module 250 also accounts for information received from IMU 230. Additionally, if tracking of display device 205 is lost (e.g., imaging device 235 loses line of sight of at least a threshold number of locators 220), tracking module 250 re-calibrates some or all of system 200.

In some embodiments, tracking module 250 tracks movements of display device 205 using second calibration data from imaging device 235. For example, tracking module 250 determines positions of a reference point of display device 205 using observed locators from the second calibration data and a model of display device 205. In some embodiments, tracking module 250 also determines positions of a reference point of display device 205 using position information from the first calibration data. Additionally, in some embodiments, tracking module 250 may use portions of the first calibration data, the second calibration data, or some combination thereof, to predict a future location of display device 205. Tracking module 250 provides the estimated or predicted future position of display device 205 to application engine 255.

Application engine 255 executes applications within system 200 and receives position information, acceleration information, velocity information, predicted future positions, or some combination thereof of display device 205 from tracking module 250. Based on the received information, application engine 255 determines content to provide to display device 205 for presentation to the user. For example, if the received information indicates that the user has looked to the left, application engine 255 generates content for display device 205 that mirrors the user's movement in an augmented environment. Additionally, application engine 255 performs an action within an application executing on console 210 in response to an action request received from input interface 240 and provides feedback to the user that the action was performed. The provided feedback may be visual or audible feedback via display device 205 or haptic feedback via input interface 240.

Figure 3A:
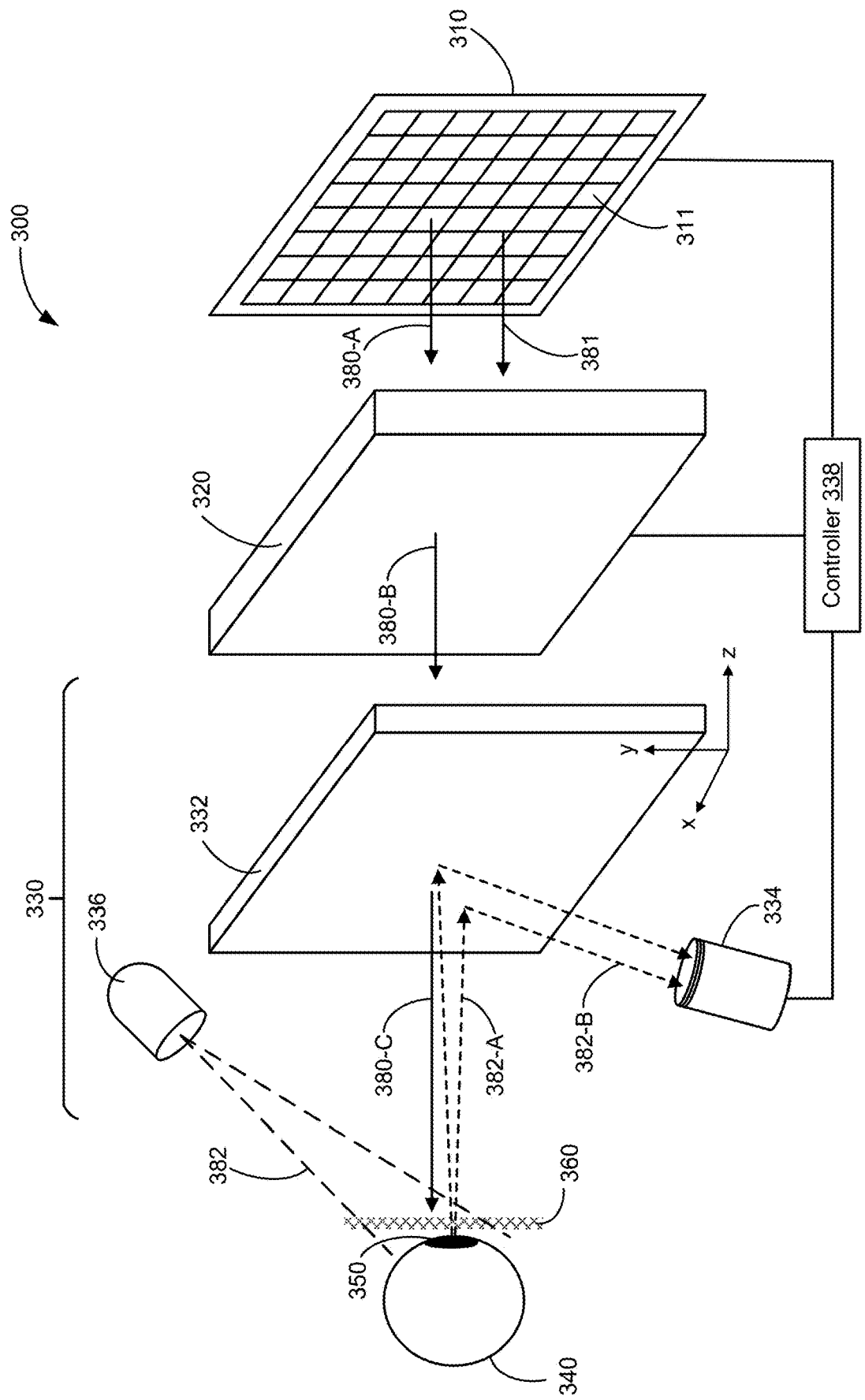
FIG. 3A is an isometric view of a display device in accordance with some embodiments.

FIG. 3A is an isometric view of display device 300 in accordance with some embodiments. In some other embodiments, display device 300 is part of some other electronic display (e.g., a digital microscope, a head-mounted display device, etc.). In some embodiments, display device 300 includes display 310 configured to output image light 380-A, an optical assembly 320 including one or more lenses, and an eye-tracking assembly 330 including a first optical element 332, a detector 334 (e.g., one or more detectors and/or cameras), and an optional illumination source 336 for providing eye-tracking light 384. In some embodiments, the eye tracking assembly is coupled to a controller 338, which may include a processor (e.g., processor 216 or application engine 255) for processing the signals detected by the detector 334, and an adjustment module (e.g., adjustment module 218) configured to make adjustments to the display 310 and/or the optical assembly 320, as discussed above.

Display 310 (e.g., electronic display 215) is configured to output image light toward the viewing user. Display 310 may include any of a waveguide, diffuser, or holographic element, such as a volume Bragg grating. In some embodiments, display 310 may also emit optional eye-tracking light 381 toward the viewing user. Display 310 includes an array of light emission devices 311 (e.g., LEDs, an array of microLEDs, an array of OLEDs, or some combination thereof) that emit visible light (e.g., light 380-A). Display 310 may optionally further include illumination devices that emit eye tracking light 381. In some embodiments, display device 300 includes one or more broadband sources (e.g., one or more white LEDs) coupled with a plurality of color filters, in addition to, or instead of, display 310.

Optical assembly 320 receives the image light (e.g., light 380-A) from display 310, and directs the image light to the eye 340 as light 380-B. In some embodiments, when the illumination devices are provided as part of the display 310, the optical assembly is further configured to transmit the eye tracking light toward the eye 340.

Illumination source 336 provides eye-tracking light 382, in addition to or in place of eye-tracking light 381. In some embodiments, eye-tracking light 381 or eye-tracking light 382 is in the IR or near-IR range. At least a portion of eye-tracking light 381 or eye-tracking light 382 is then reflected off the eye 340. As shown in FIG. 3A, eye-tracking light 381 and/or eye-tracking light 382 reflected off the eye, together with image light 380-C reflected off the eye, are together referred to as light 382-A propagating toward first optical element 332. Light 382-A may include light retro-reflected from the retina of eye 340, a cornea of eye 340, a crystalline lens of eye 340, a sclera of the eye 340, or some combination thereof. First optical element 332 is configured to receive light 382-A and redirect a portion of light 382-A toward the detector 334 as light 382-B. Detector 334 is configured to receive light 382-B and forms an image of the eye with light 382-B, which is used to determine a gaze direction of the eye 340. The detected gaze direction is then used to make adjustments to the display 310 and/or the optical assembly 320, as discussed above. First optical element 332 is also configured to transmit light 380-B from optical assembly 320 as light 380-C toward the eye 340 or eyebox 360.

In some embodiments, first optical element 332 includes a PSH optical element configured to redirect incident light having a set of properties without changing its polarization (e.g., redirect at least a portion of light 382-A as 382-B), and to transmit light not having the set of properties (e.g., light 380-C) without changing its direction or polarization. The set of properties may include properties related to, for example, polarization, wavelength, and/or incident angle. For example, the PSH optical element can be configured to reflect light of a specific polarization (e.g., right-circularly polarized or RCP light) in a specific wavelength range (e.g., a wavelength range in infrared and/or near infrared spectrum), and to transmit all other light, such as left-circularly polarized (LCP) light of any wavelength and RCP light that has a wavelength outside of the specific wavelength range. Further, the PSH optical element may also have angular selectivity such that the set of properties also include an incident angle range for light having the specific polarization and in the specific wavelength range. In some embodiments, the PSH optical element is configured to redirect or reflect incident light of the specific polarization and within the specific wavelength range (e.g., light 382-A) when the incident light is also incident on the PSH at an angle within a specific angular range (e.g., 0-20 degrees) with respect to an optical axis of first optical element 332.

Additionally, detector 334 has an aperture that further limits the incident angle of light impinging on a first surface 322-1 of first optical element 332 that eventually makes its way into the detector to form the image of the eye, resulting in the eye-tracking assembly 330 having telecentric properties, as discussed below.

Figure 3B:
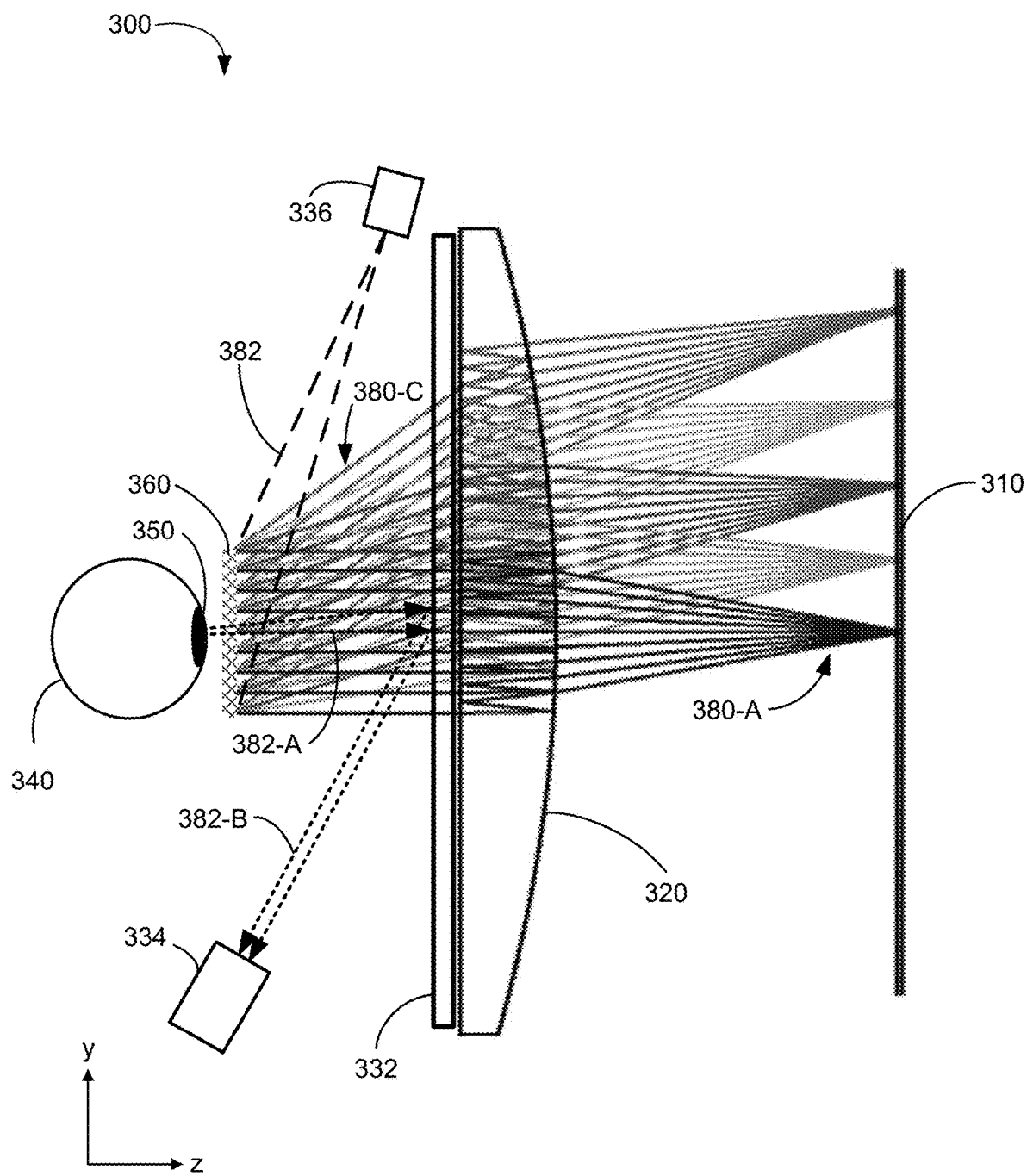
FIG. 3B illustrates a display device in accordance with some embodiments.

FIG. 3B illustrates display device 300 showing optical paths of image light 380-A output from display 310 and optical paths of eye-tracking light 382 from illumination source 336 in accordance with some embodiments. In some embodiments, as shown in FIG. 3B, eye-tracking assembly 330 includes first optical element 332, detector 334, and illumination source 336.

As shown in FIG. 3B, display 310 is configured to output image light 380-A toward optical assembly 320. Optical assembly 320 is configured to receive image light 380-A and transmit the image light towards the eyes 340 or eyebox 360. In some embodiments, optical assembly 320 may include, for example, a microlens array or a pancake lens assembly configured to focus or direct the image light 380-A towards the eye 340. In some embodiments, when optical assembly 320 is a pancake lens assembly, as shown in FIG. 3B, the optical path of the image light includes at least one fold. In some embodiments, optical assembly 320 may include active features that can be dynamically adjusted by controller 338 (shown in FIG. 3A) based on a determination of the location of the user's eyes or gaze direction. Examples of such active features include a deformable mirror (e.g., microelectromechanical system device, galvanometer mirror), a deformable membrane, and an electro-optic component (e.g., spatial light modulator, liquid crystal lens or lens array).

First optical element 332 is configured to receive image light (e.g., image light 380-B shown in FIG. 3A) transmitted through optical assembly 320 and transmit the image light towards the eyes 340 as image light 380-C. For example, as shown in FIGS. 3A and 3B, image light 380-B output from optical assembly 320 is transmitted through first optical element 332 as image light 380-C. In this example, first optical element 332 is configured to interact with light in the specific wavelength range (e.g., IR range, near-IR range) corresponding to eye-tracking light 382 (e.g., light having wavelength $\lambda_1$ that is inside the specific wavelength range). Image light 380-B has wavelengths (e.g., wavelengths corresponding to visible light), $\lambda_2$, that are outside the specific wavelength range. Thus, image light 380-B is transmitted through first optical element 332 (regardless of polarization and incident angle) as image light 380-C without change in the polarization or direction of image light 380-B.

In some embodiments, first optical element 332 is configured to receive and transmit image light 380-B having a wavelength $\lambda_2$ outside the specific wavelength range.

In some embodiments, as shown, first optical element 332 is adjacent to optical assembly 320. In some embodiments, as shown, optical assembly 320 includes a flat surface facing the eye and first optical element 332 is formed on the flat surface of optical assembly 320. In some embodiments, first optical element 332 is formed on a surface of optical assembly 320.

Figure 3C:
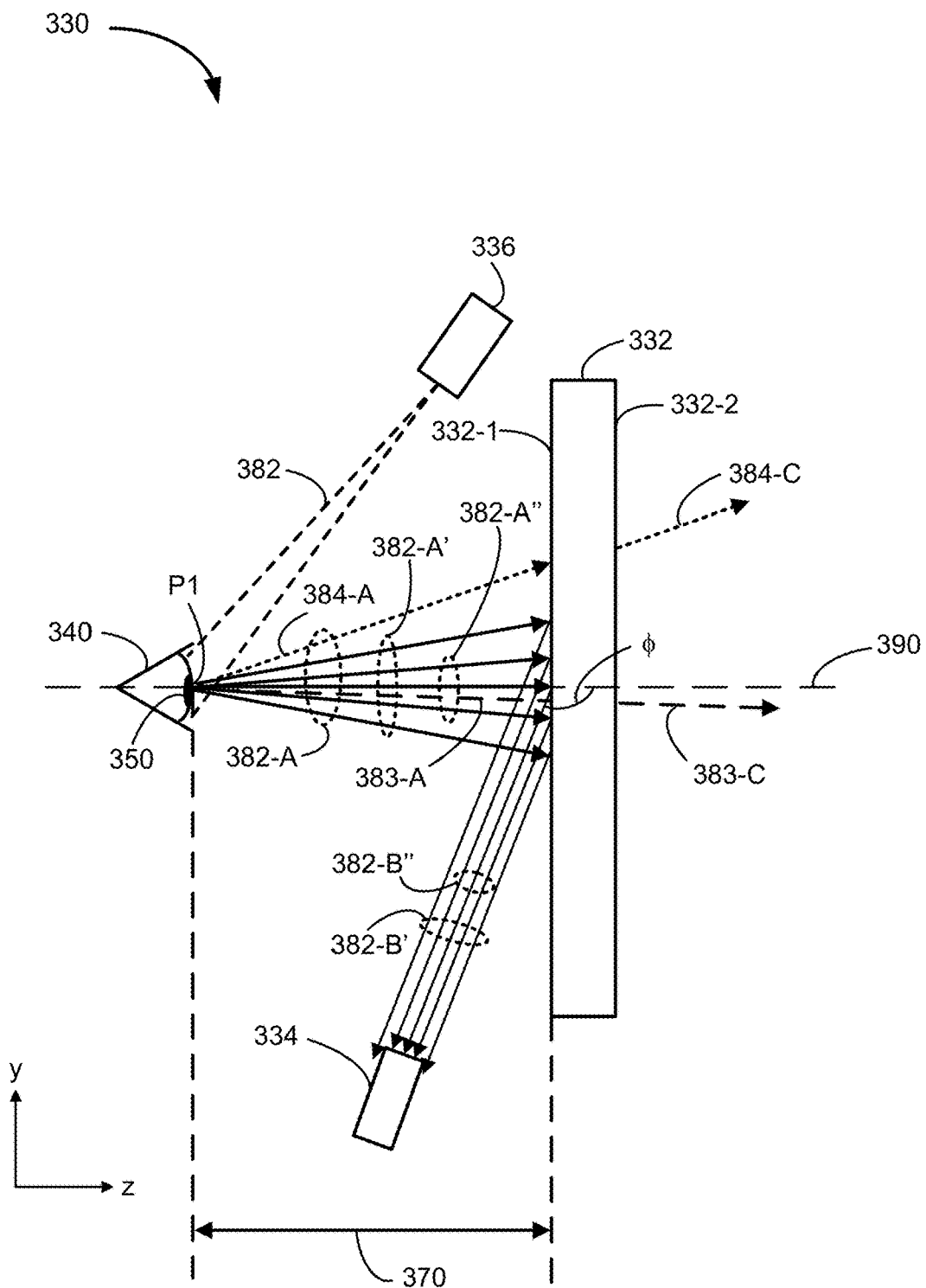
FIGS. 3C-3F illustrate an eye-tracking assembly in a display device in accordance with some embodiments.

FIG. 3C illustrates various portions of light 382-A reflected off a point, P1, of eye 340 and their respective optical paths. As shown in FIG. 3C, light 382-A can be considered as including, for example, the following portions with various properties:

light 382-A' having the specific (e.g., predefined, predetermined) polarization, incident angles within the specific (e.g., predefined, predetermined) angular range, and wavelengths within the specific (e.g., predefined, predetermined) wavelength range;

light 383-A having incident angles within the specific angular range, and having polarization that is opposite to the specific polarization or wavelengths outside the specific wavelength range;

light 384-A having incident angles outside the specific angular range.

As shown in FIG. 3B, because of its relatively large incident angles, light 384-A, regardless of its polarization or wavelength, is transmitted by first optical element 332 as light 384-C without changes in its polarization or direction of propagation. Light 383-A, either due to its polarization, or wavelength, or both, is also transmitted by first optical element 332 as light 383-C without changes in its polarization or direction of propagation.

Light 382-A', on the other hand, is redirected and focused toward detector 334 as light 382-B' in a direction that forms an angle φ with optical axis 390. Light 382-A' starts as a diverging beam propagating from point P1 of the eye 340 toward first optical element 332. After being redirected and focused by first optical element 332, it enters detector 334 as a substantially collimated beam 382-B' (e.g., the beam has a divergence or angular spread that is no greater than 3 degrees). In some embodiments, 100 degrees<φ<170 degrees. In further embodiments, 120 degrees<φ<150 degrees. In some embodiments, an aperture of detector 334 can be designed that not all of light 382-B' makes it through the aperture of detector 334 and be detected by detector 334. As shown in FIG. 3C, a portion of light 382-B', (i.e., light 382-B") is detected by detector 334. Light 382-B" corresponds to light 382-A", which is a portion of light 382-A'. As shown in FIG. 3C, light 382-A" has a smaller angular spread than light 382-A'. Thus, the angular spread of the light from any point of the eye 340 that makes its way to an image plane of the detector is limited by both the optical properties of first optical element 332 and the aperture of detector 334.

Figure 3D:
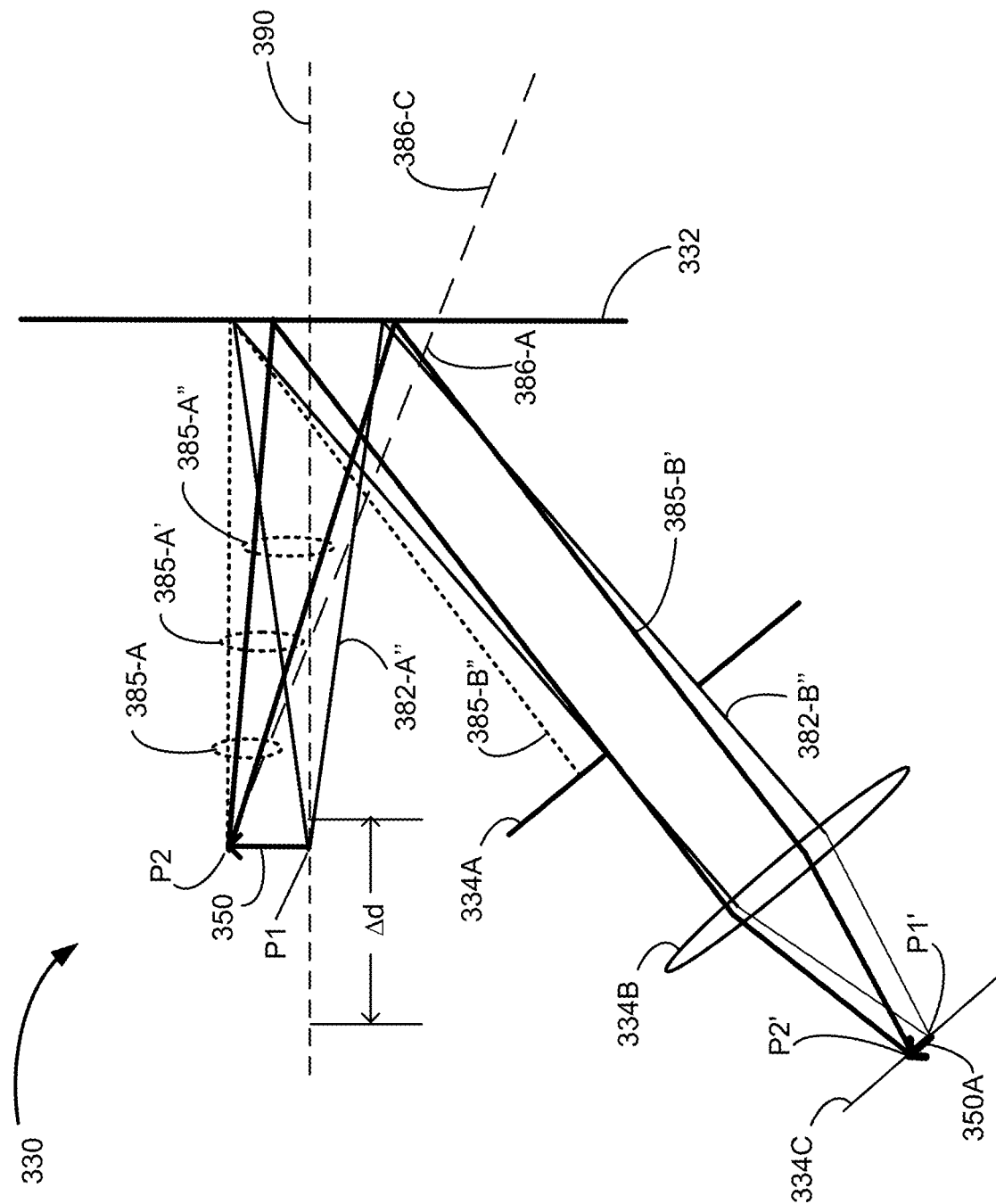

FIG. 3D illustrates eye-tracking assembly 330 forming an image 350A of an object (e.g., pupil 350 of eye 340) according to some embodiments. As shown in FIG. 3D, detector 334 includes aperture 334A, lens or lens assembly 334B, and image plane 334C having, for example, CCD sensors. Light 382-B" from point P1 of eye 340 is focused onto point P1', which is part of image 350A on image plane 334C. Light 385-A reflected off point P2 of eye 340, having the specific polarization and wavelength(s) in the specific wavelength range, propagates toward first optical element 332 as a diverging beam. A portion of light 385-A (e.g., light 385-A') is redirected and focused by first optical element 332 as light 385-B'. A portion of light 385-B' enters aperture 334A as a substantially collimated beam (e.g., the beam has a divergence or angular spread that is no greater than 3 degrees) and is focused by lens 334B onto point P2 on image plane 334C. A another portion of 385-B' (as shown in by the dotted line labeled 385-B") is blocked by aperture 334A. FIG. 3D also shows that light 386-A, which is another portion of light 385-A, is transmitted by first optical element 332 as light 386-C, due to its relatively large incident angles. Thus, both first optical element 332 and aperture 334A limit the angular spread of light from pupil 350 that is used to form the image 350A of pupil 350, resulting in the telecentric properties of eye-tracking assembly 330, which allow the pupil to be anywhere in a predetermined distance range Δd from first optical element 332 while the size of image 350A remains substantially the same.

Figure 3F:
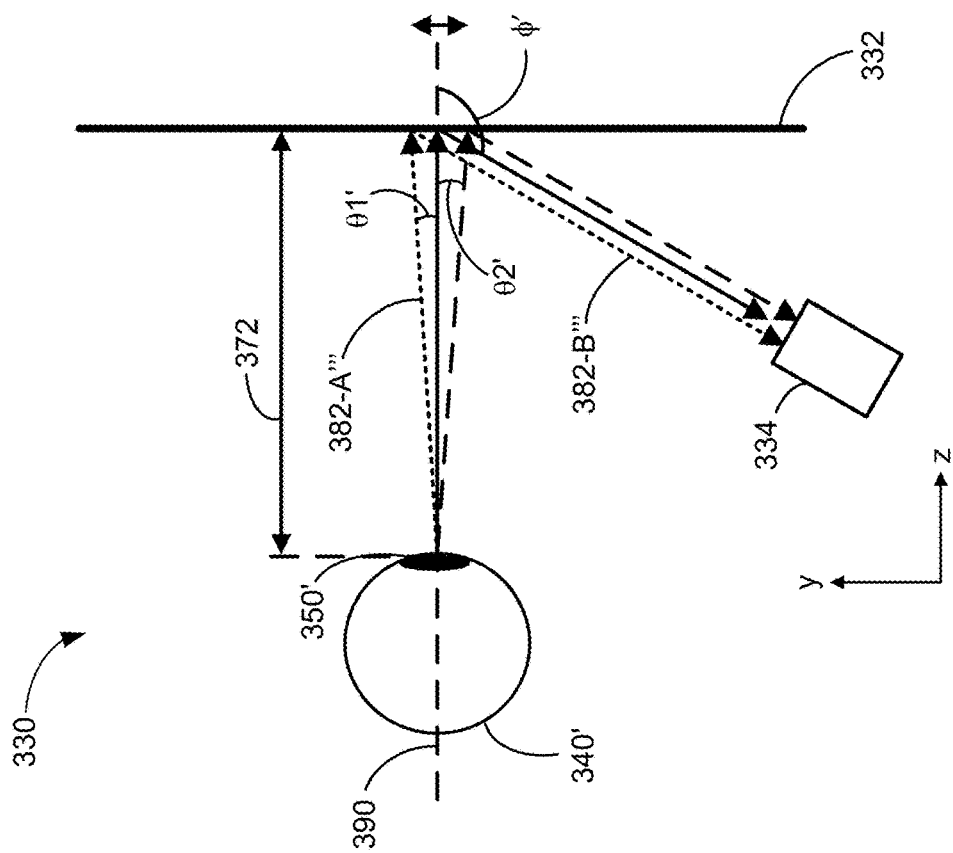
Figure 3E:
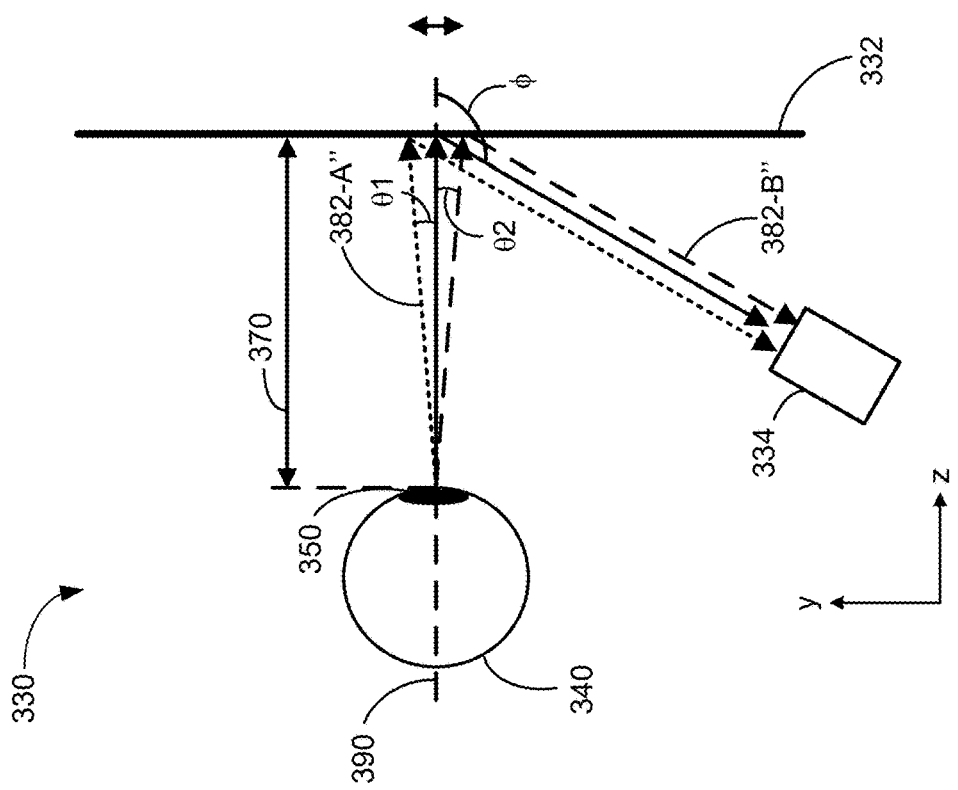

FIGS. 3E and 3F show telecentric eye-tracking assembly 330 with eye 340 at different distances from first optical element 332. As shown in FIG. 3E, light reflected off a certain point of eye 340 at a first distance 370 from first optical element 332 propagates toward first optical element 332 as a diverging beam 382-A" with an angular spread of (θ1+θ2), and is redirected as a substantially collimated light beam 382-B" (e.g., the beam has a divergence or angular spread that is no greater than 3 degrees) that is detected by detector 334. As shown in FIG. 3F, light reflected off a certain point of a same or different eye 340' at a second distance 372 from first optical element 320 propagates toward first optical element 332 as a diverging beam 382-A''' with an angular spread of (θ1'+θ2'), and is redirected as a substantially collimated light beam 382-B''' (e.g., the beam has a divergence or angular spread that is no greater than 3 degrees) that is detected by detector 334. Both the first distance and the second distance are within the predetermined distance range. Due to the limits placed by the first optical element 332 and the aperture of detector 334 on the incident angle, despite the difference in distance from first optical element 332, the image of eye 340 formed in the detector 334 will have about the same size as the image of eye 340' formed in the detector 334, which is one of the telecentric properties of eye-tracking assembly 330.

In some embodiments, as shown in FIG. 3B, optical assembly 320 may be located between display 310 and first optical element 332. In some embodiments, as shown in FIG. 3B, first optical element 332 may be adjacent to, in contact with, or attached to a surface of optical assembly 320. In some embodiments, first optical element 332 may include one or more thin films formed on a surface of optical assembly 320.

Illumination source 336 is configured to illuminate the eye 340 with eye-tracking light 382, which includes light within the predetermined (e.g., specific, predefined) wavelength range. Eye-tracking light 382 is reflected off the eye as light 382-A as described above.

Figure 4A:
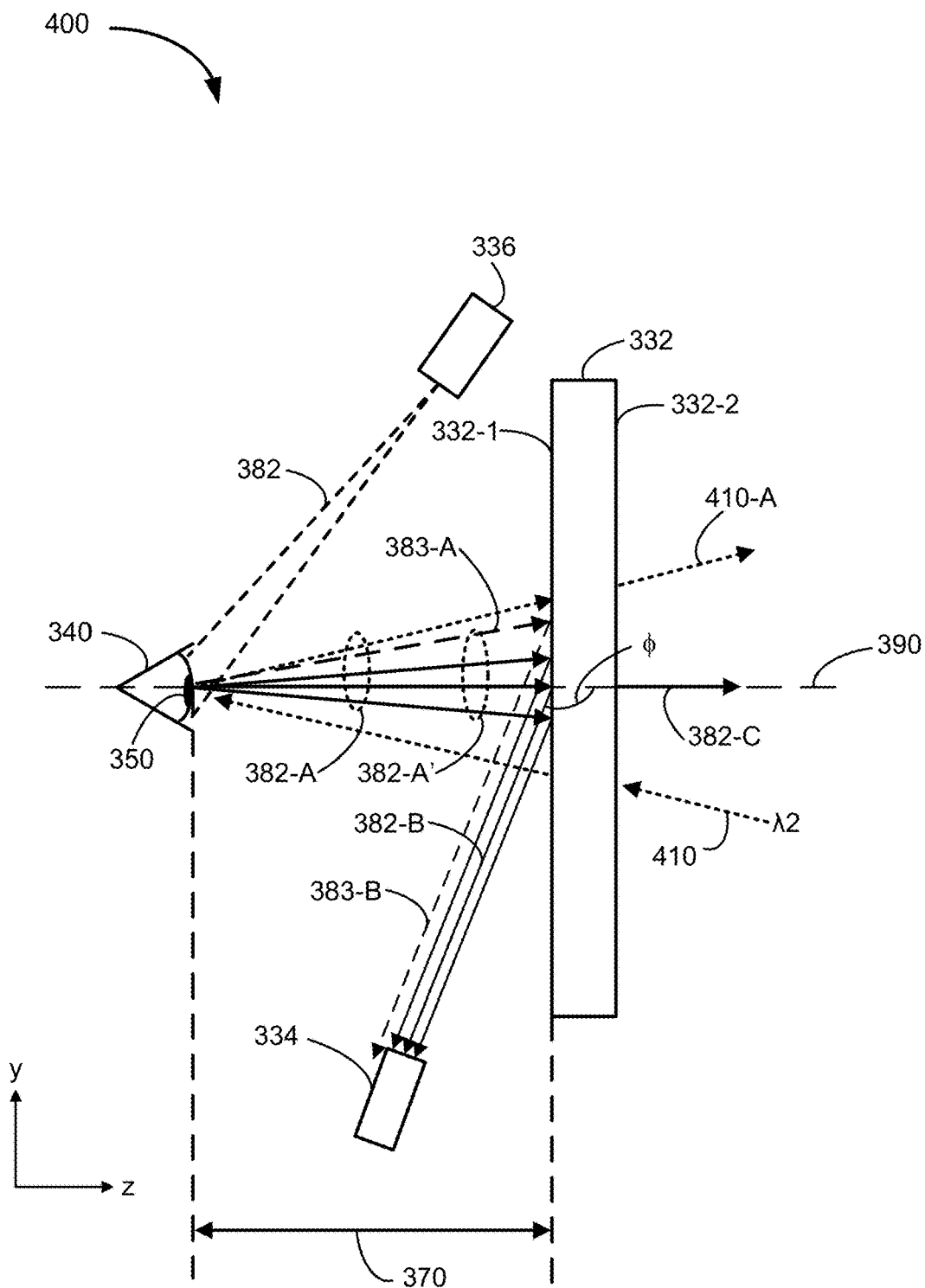
FIGS. 4A-4D illustrate an eye-tracking assembly in accordance with some embodiments.

FIG. 4A illustrates the optical paths of light in telecentric eye-tracking assembly 400 in accordance with some embodiments. First optical element 332 has a first surface facing the eye 340 and a second surface 332-2 opposite to the first surface 332-1 and facing display 310. First optical element 332 includes a telecentric PSH. In FIG. 4A, eye 340 is located at a first distance 370 away from first optical element 332.

Light 410 may include image light (e.g., light 380-A, light 380-B) output from a display (e.g., display 310). Light 410 may also include, in augmented-reality applications, ambient light from outside the display device (e.g., display device 300). First optical element 332 is configured to transmit light 410 without changing the polarization or direction of light 410. In some embodiments, at least a portion of light 410 reaches the eye 340 and is reflected off the eye 340 as light 410-A, which may include, for example, light 410 retro-reflected from the retina of eye 340, a cornea of eye 340, a crystalline lens of eye 340, or some combination thereof. First optical element 332 is configured to receive light 410-A and to transmit light 410-A, regardless of its polarization or incident angle, without changing the direction or polarization of light 410-A. In some embodiments, image light is visible light (e.g., light in the visible wavelength range).

Illumination source 336 is configured to provide eye-tracking light 382 and illuminate at least a portion of eye 340 that includes pupil 350. In some embodiments, at least a portion of eye-tracking light 382 reaches the eye 340 and is reflected off the eye 340 as light 382-A, which may include, for example, light that is retro-reflected from the retina of eye 340, a cornea of eye 340, a crystalline lens of eye 340, or some combination thereof. First optical element 332 is configured to receive light 382-A and light 383-A.

A first portion of light 382-A (e.g., light 382-A' including light 383-A) is redirected (e.g., reflected, deflected, diffracted, focused) by first optical element 332 towards detector 334 as light 382-B and light 383-B, respectively. Light 382-B and light 383-B each form a first beam propagating in an off-axis direction, toward detector 334, that forms an angle φ with respect to optical axis 390 of first optical element 332, as described above with respect to FIGS. 3A-3F. The first beam is substantially collimated (e.g., the beam has a divergence or angular spread that is no greater than 3 degrees). Light 382-A', including light 383-A, impinges on the first surface 322-1 of the optical element with incident angles in the specific (e.g., predefined, predetermined) angular range, has a first circular polarization (e.g., RCP), and wavelengths within the specific wavelength range. In some embodiments, light 382-A is incident upon first optical element in a direction that is substantially along an optical axis 390 of first optical element (e.g., light 382-A forms an angle with optical axis 390 that is less than 10 degrees). In certain embodiments, φ is larger than 90 degrees and smaller than 180 degrees. Detector 334 is configured to receive light 382-B, which is used to determine the position of the pupil 350 of the eye or the gaze direction of the eye 340. As described above in FIG. 3D, detector 334 may include an aperture 334A. In such cases, light 383-A impinges on first optical element 332 at an incident angle that is within the first predetermined angular range and is redirected off the first surface 332-1 of optical element 332 as light 383-B such that light 383-B forms angle ϕ with optical axis 390. However, light 383-B does not make it through aperture 334A of detector 334 and is not received by detector 334.

In some embodiments, the specific (e.g., predefined, predetermined) wavelength range is between 780 nm and 2.5 µm (e.g., near-infrared wavelengths, between 780 nm and 2.5 µm). In some embodiments, the light is near-infrared light. In some embodiments, the light is infrared.

A second portion of light 382-A is transmitted from the first surface 332-1 to the second surface 332-2 of first optical element 332 as light 382-C without a change in polarization. The second portion of light 382-A that is transmitted as light 382-C includes light having a polarization that is different from the first circular polarization, light having wavelengths outside the specific (e.g., predefined, predetermined) wavelength range, or light having incident angles outside the specific (e.g., predefined, predetermined) angular range.

Figure 4B:
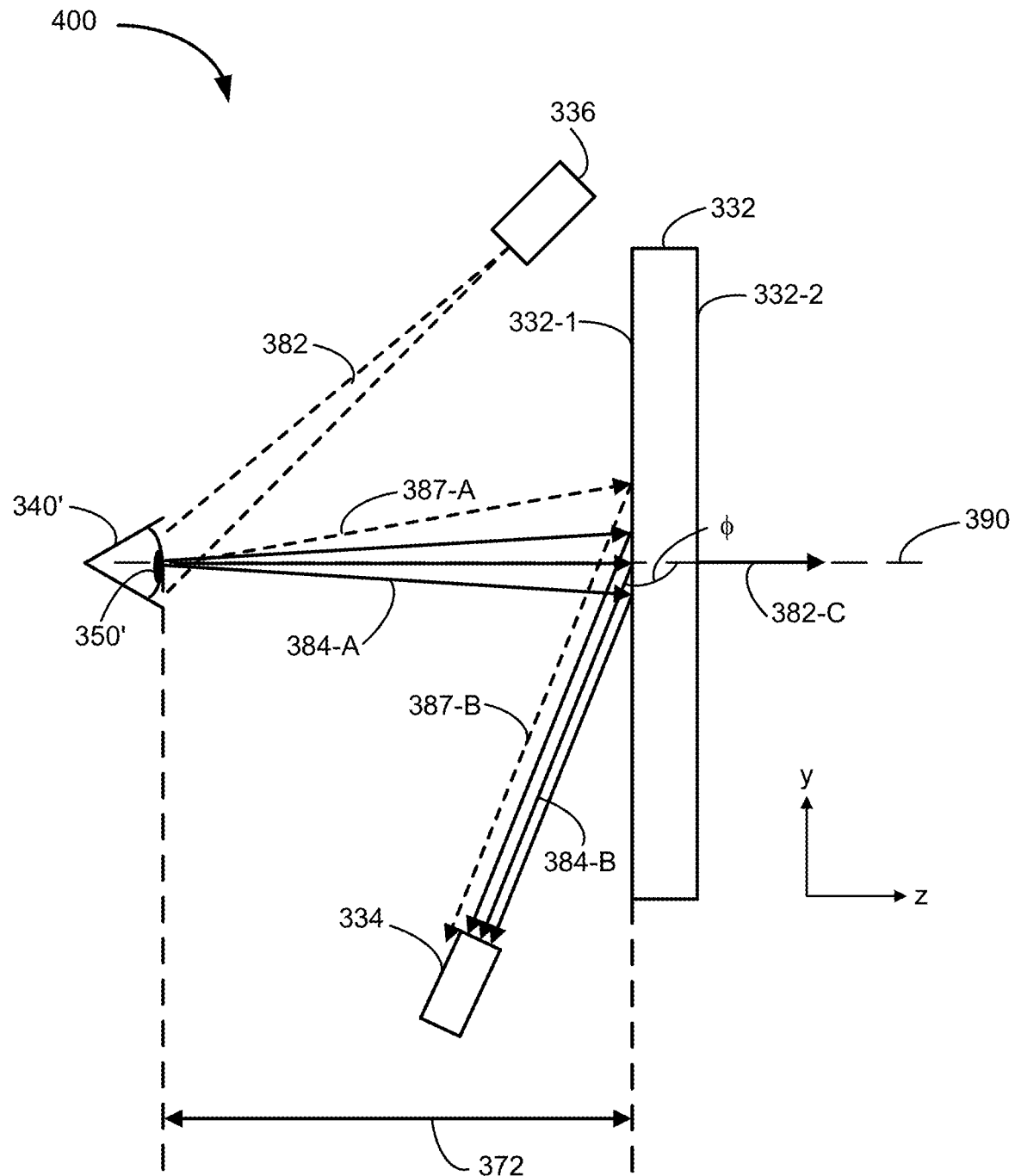

FIG. 4B illustrates the optical paths of light in telecentric eye-tracking assembly 400 in accordance with some embodiments. The optical elements shown in FIG. 4B are the same as those shown in FIG. 4A. However, in FIG. 4B, the user's eye 340' is located at a second distance 372, distinct from first distance 370 and within the predetermined distance range, from first optical element 332. The optical paths of light 384-A, light 384-B, and light 384-C, shown in FIG. 4B, correspond to the optical paths of light 382-A, light 382-B, and light 382-C, respectively, shown in FIG. 4A. Similarly, the optical path of light 387-A and light 387-B correspond to the light paths of light 383-A and light 383-B.

Despite light 382-A and light 384-A originating from different distances (e.g., as reflection off a user's eye 340 located at first distance 370 and off a user's eye 340' located at second distance 372, respectively), light 382-A and light 384-A are redirected by first optical element 332 towards detector 334 at the same optical power and the same magnification, demonstrating the telecentric property of telecentric PSH and telecentric eye-tracking assembly 400.

In some embodiments, the first distance is 10 mm. In some embodiments, the second distance is 25 mm. In some embodiments, the predetermined distance range is between 10 mm and 25 mm. In some embodiments the second distance is different from the first distance by no greater than 15 mm.

Figure 4C:
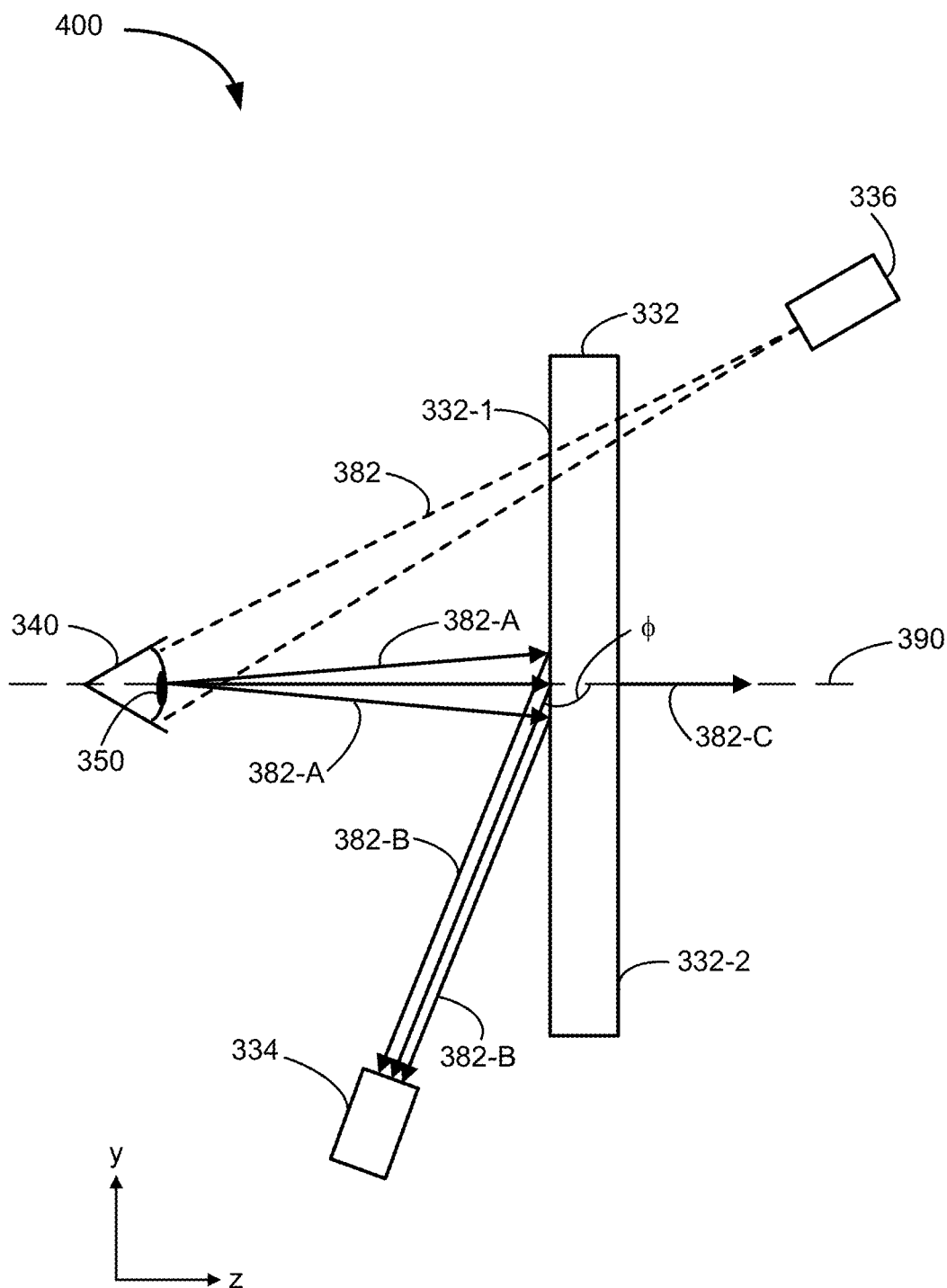

As shown in FIG. 4C, in some embodiments, first optical element 332 is configured to transmit eye-tracking light 382.

Figure 4D:
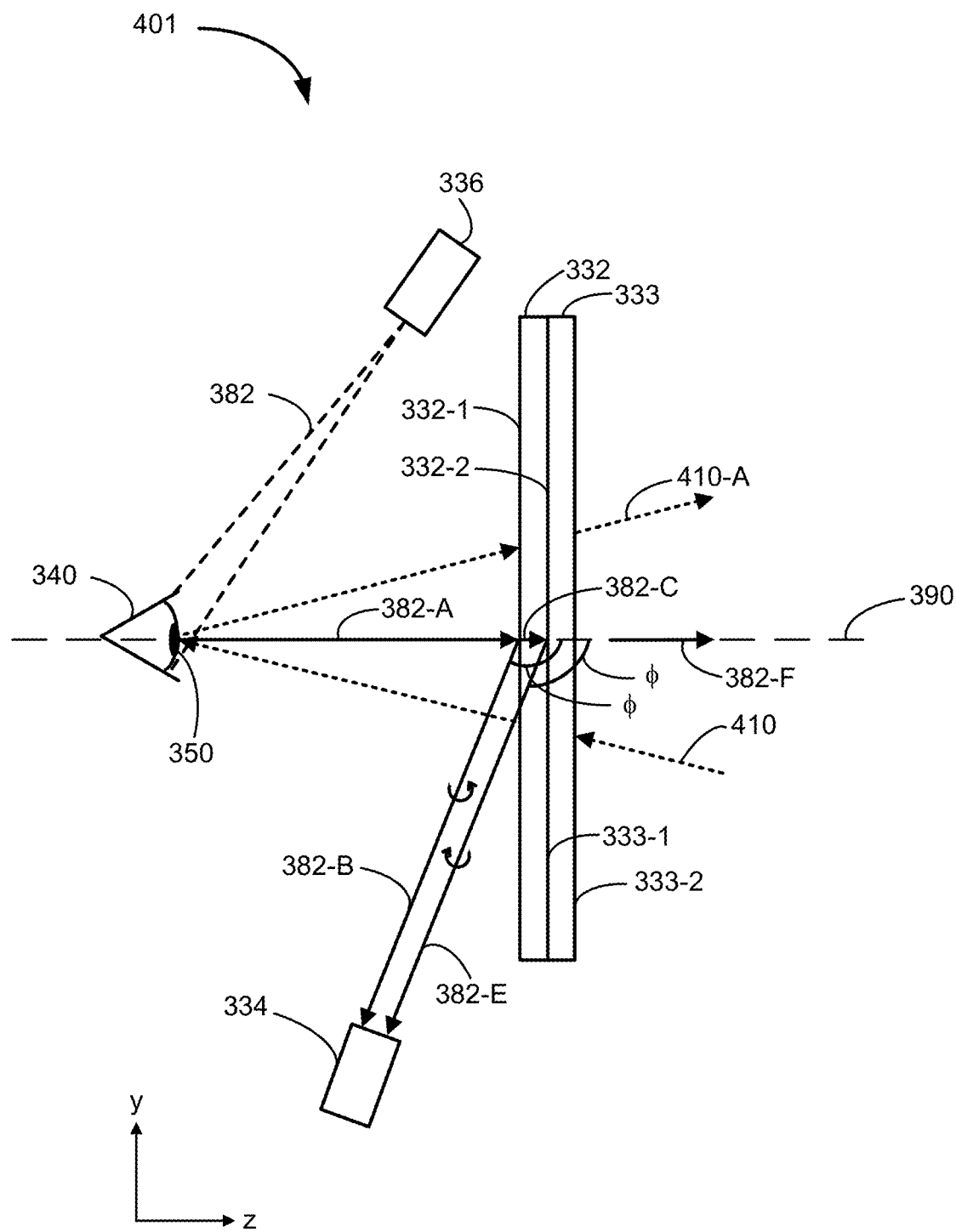

Referring to FIG. 4D, eye-tracking assembly may include a second optical element 333. Second optical element 333 has a first surface facing the eye 340, and a second surface 333-2 opposite to the first surface 333-1 and facing display 310. In some embodiments, second optical element 333 includes a telecentric PSH optical element.

In some embodiments, as shown in FIG. 4D, first surface 333-1 of second optical element 333 is adjacent to (e.g., touching, located on, facing, attached to, or next to) second surface 332-2 of first optical element 332 such that first optical element 332 is located between second optical element 333 and eye 340. Alternatively, second surface 333-2 of second optical element may be adjacent to (e.g., touching, located on, facing, attached to, or next to) first surface 332-1 of first optical element 332 such that second optical element 333 is located between first optical element 332 and eye 340. Thus, the respective positions of first optical element 332 and second optical element 333 are interchangeable.

In some embodiments, second optical element 333 is configured to transmit light 410 and light 410-A as described above with respect to first optical element 332 in FIG. 4A, and the description regarding this function is not repeated here for brevity.

In some embodiments, first optical element 332 is configured to redirect (e.g., reflect, refract, diffract, focus) light in the specific wavelength range and having a first circular polarization and second optical element 333 is configured to redirect (e.g., reflect, refract, diffract, focus) light in the specific wavelength range and having a second circular polarization different from (e.g., opposite to) the first circular polarization. For example, as shown in FIG. 4D, light reflected off the eye 340 (e.g., light 382-A) is incident on first surface located on a first surface 332-1 of first optical element 332. A first portion of light 382-A in the specific wavelength range and having a first circular polarization (e.g., RCP) is redirected (e.g., reflected, deflected, diffracted) by first optical element 332 towards detector 334 as light 382-B having the first circular polarization (e.g., RCP), described above with respect to FIGS. 3A-3C, and 3E-3F. A second portion (e.g., a remaining portion) of light 382-A is transmitted from the first surface 332-1 to the second surface 332-2 of first optical element 332 (e.g., transmitted through first optical element 332) as light 382-C and is incident on the first surface 333-1 of second optical element 333. A first portion of light 382-C, that is in the specific wavelength range and has a second circular polarization (e.g., LCP) different from the first circular polarization, is redirected by (e.g., reflected, deflected, diffracted) by second optical element 333 towards detector 334 as light 382-E having the second circular polarization (e.g., LCP). Light 382-E is redirected by second optical element 333 in an off-axis direction that forms an angle ϕ with respect to optical axis 390. Light 382-B and light 382-E each form a collimated beam propagating towards detector 334. A second portion of light 382-C, that is not redirected by second optical element 333, is transmitted through second optical element 333 as light 382-F. For example, light 382-F may include light outside of the specific wavelength range.

By including second optical element 333 in addition to first optical element 332, the efficiency of telecentric eye-tracking assembly 400 in detecting light reflected off eye 340 is increased since detector 334 receives not only a portion of light 382-A having the first circular polarization (e.g., RCP), but also a portion of light 382-A having the second circular polarization (e.g., LCP).

Figure 5:
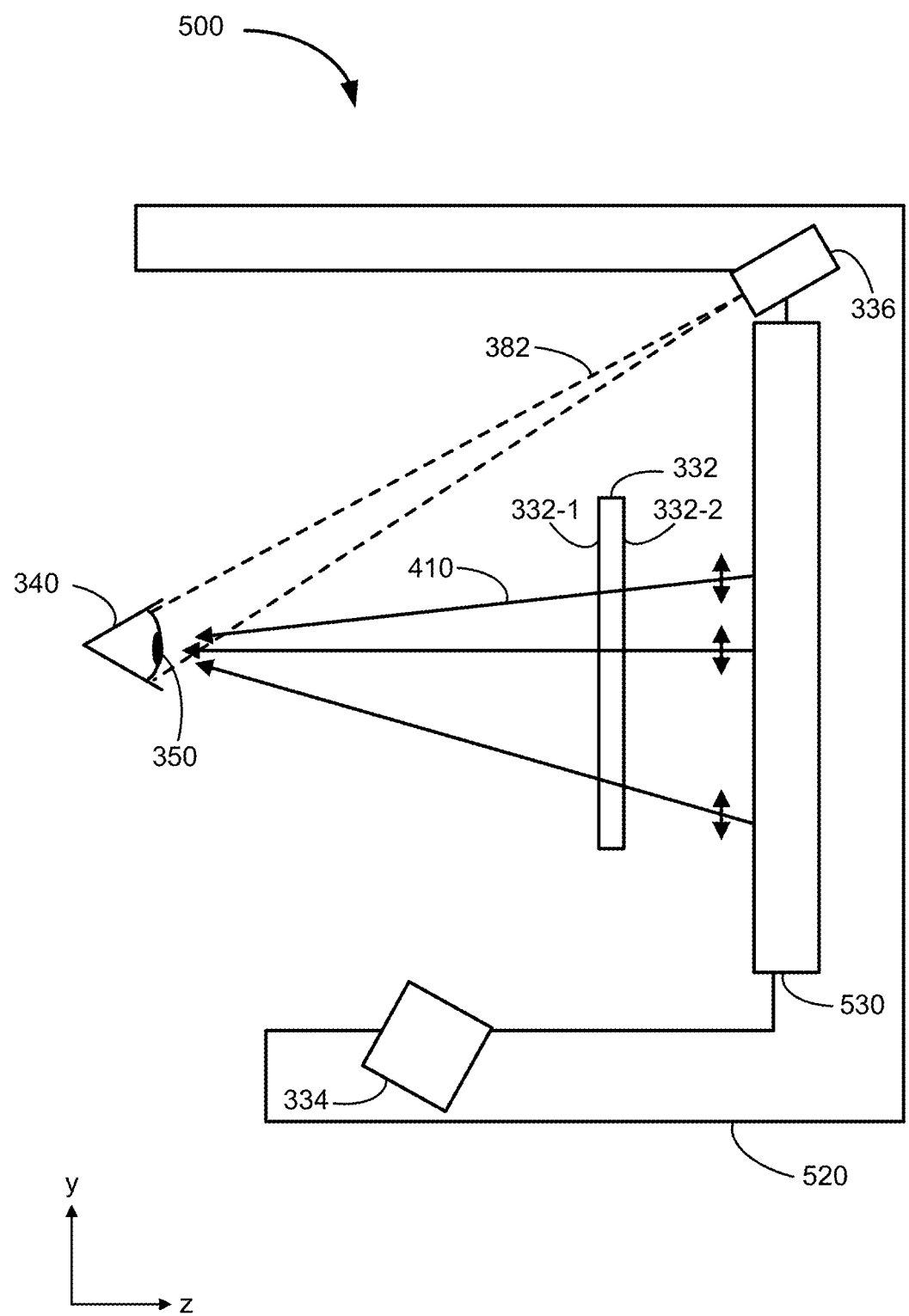
FIG. 5 illustrates an eye-tracking assembly in a display device in accordance with some embodiments.

FIG. 5 illustrates a telecentric eye-tracking assembly 400 in display device 500 in accordance with some embodiments. Display device 500, corresponding to display devices 100, 205, and 300, includes a display system 530, an eye-tracking assembly 330, and a frame 520. The display system 530 includes display 310, and an optical assembly 320. The display system 530 is configured to output image light (e.g., from display 310) corresponding to one or more images and to project (e.g., through optical assembly 320) image light toward the eye 340. The eye-tracking assembly includes illumination source 336, one or more optical elements (e.g., first optical element 332, second optical element 333), and detector 334. The first optical element 332 is positioned adjacent to optical assembly 320. In some embodiments, as shown in FIG. 3B, the first optical element is formed on a surface of optical assembly 320. In some embodiments, optical assembly 320 has a flat surface facing the eye and first optical element 332 is formed on the flat surface of optical assembly 320.

In some embodiments, as shown, one or more of display system 530 display 310, illumination source 336, and detector 334 are located on (e.g., touching, proximate to, adjacent to, mounted on, embedded in, suspended from) frame 520. Although display device 500 shows that eye-tracking light 382, output from illumination source 336, is not transmitted through first optical element 332 before reaching the eye 340, it is understood that in some embodiments, illumination source 336 and first optical element 332 may be arranged in display device 500 such that the eye-tracking light 382 may be transmitted from the second surface 322-2 of first optical element 322 to the first surface 322-1 of the first optical element 332 before reaching the eye 340, as shown in FIG. 4C.

Light 410, having a first linear polarization, is output display 310 and is transmitted through first optical element 332 towards the user's eye 340. In some embodiments, when second optical element 333 is included in the eye-tracking assembly, second optical element 333 is also configured to transmit light 410 so that light 410 may reach the eye 340.

In some embodiments, display device 500 is a head-mounted display device that is configured to be mounted near an eye 340 of a user.

FIGS. 6A-6E illustrate telecentric PSH optical element 600 in first optical element 332, described above with respect to FIGS. 3A-3E and 4A-4D, in accordance with some embodiments.

In some embodiments, telecentric PSH optical element 600 includes a layer of liquid crystals arranged in helical structures (e.g., a liquid crystal formed of a cholesteric liquid crystal). Telecentric PSH optical element 600 is polarization selective with respect to circular polarization of light. When the circularly polarized light has a handedness that corresponds to (e.g., is along or has the same handedness as) the helical twist of liquid crystal structures along their helical axis in telecentric PSH optical element 600, telecentric PSH optical element 600 interacts with the circularly polarized light, resulting in change of the direction of propagation of the light (e.g., reflect, refract, or diffract the light). In some embodiments, the polarization of the light is also changed to an opposite polarization (e.g., to a circular polarization having the opposite handedness). In contrast, telecentric PSH optical element 600 will transmit light that has a circular polarization with opposite handedness to the helical twist of liquid crystal structures in telecentric PSH optical element 600 without changing its direction or polarization. Telecentric PSH optical element 600 can be a transmissive PSH optical element or a reflective PSH optical element. As a transmissive PSH optical element, telecentric PSH optical element 600 can be configured to transmit and change the direction and polarization of light having certain properties while transmitting light not having the certain properties without changing its direction and polarization. The certain properties may include, for example, polarization, wavelength, and/or incident angle. As a reflective PSH optical element, telecentric PSH optical element 600 can be configured to reflect and change the direction of light having certain properties without changing the polarization of light while transmitting light not having the certain properties without changing its direction and polarization.

For example, a transmissive PSH optical element can have right-handed liquid crystal helical structures and can be configured to change the polarization of RCP light impinged thereon to LCP light while simultaneously redirecting (e.g., refracting, diffracting, focusing) the RCP light. On the other hand, such a transmissive PSH optical element would transmit LCP light impinged thereon without changing its polarization or direction. In another example, a reflective PSH optical element can have right-handed liquid crystal helical structures and can be configured to redirect (e.g., reflect, refract, diffract, focus) RCP light impinged thereon without changing the polarization of the RCP light while transmitting LCP light impinged thereon without changing its polarization or direction. In addition to polarization selectivity, telecentric PSH optical element 600 may also have wavelength selectivity. For example, a right-handed reflective PSH optical element is configured to reflect RCP light within a specific wavelength range and to transmit all other light, including LCP light within the specific wavelength range and RCP light that has a wavelength outside of the specific wavelength range. Further, telecentric PSH optical element 600 may also be configured to have angular selectivity such that the telecentric PSH optical element interacts with light that is incident upon a surface of telecentric PSH optical element 600 within a certain (e.g., specific, predetermined) angular range (e.g., substantially parallel to an optical axis of telecentric PSH optical element 600, in some cases, the light and an optical axis of telecentric PSH optical element 600 form an angle that is less than 1 degree) and satisfies the polarization and wavelength conditions as described above. Light that is incident on the surface of telecentric PSH optical element 600 at an angle that is outside the certain angular range would be transmitted through telecentric PSH optical element 600 with no change in polarization or direction.

Additionally, telecentric PSH optical element 600 is configured to focus light of an object at a same magnification regardless of the distance between telecentric PSH optical element 600 and the object. For example, telecentric PSH optical element 600 will focus light reflected off a first object located a first distance away from telecentric PSH optical element 600 and light reflected off a second object located a different, second distance away from telecentric PSH optical element 600 to the same location and with the same magnification. Telecentric PSH optical element 600 is described in further detail below with respect to FIGS. 6A-6F.

Figure 6B:
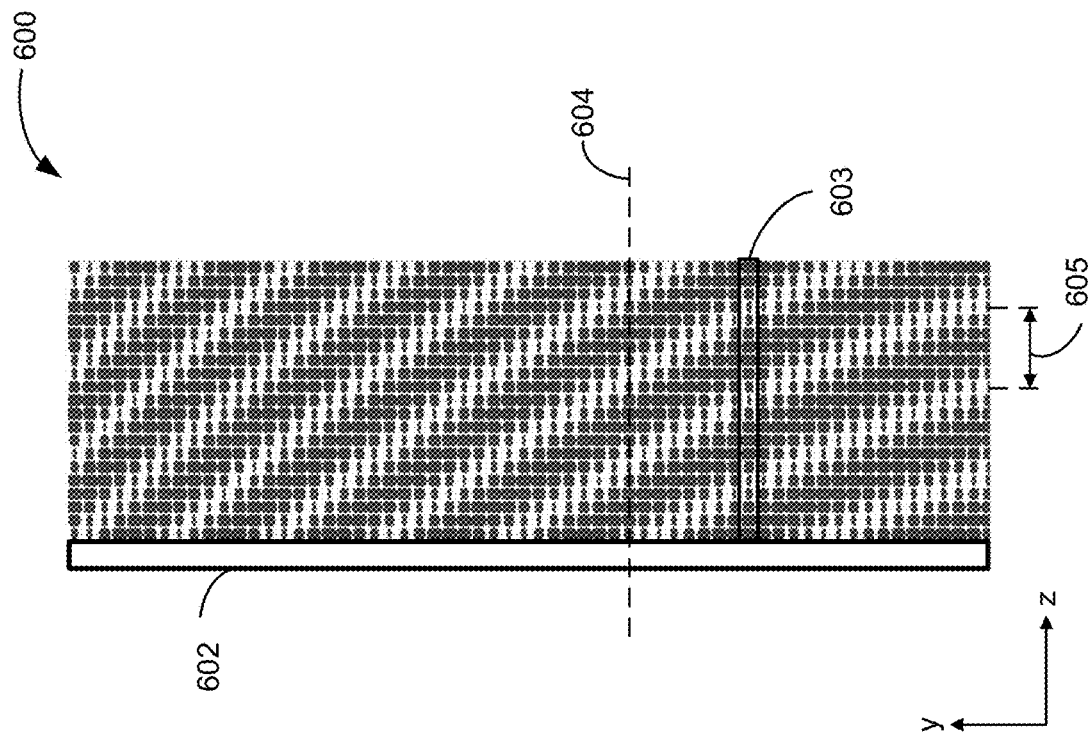
FIGS. 6A-6E illustrate a telecentric polarization sensitive hologram in accordance with some embodiments.
Figure 6A:
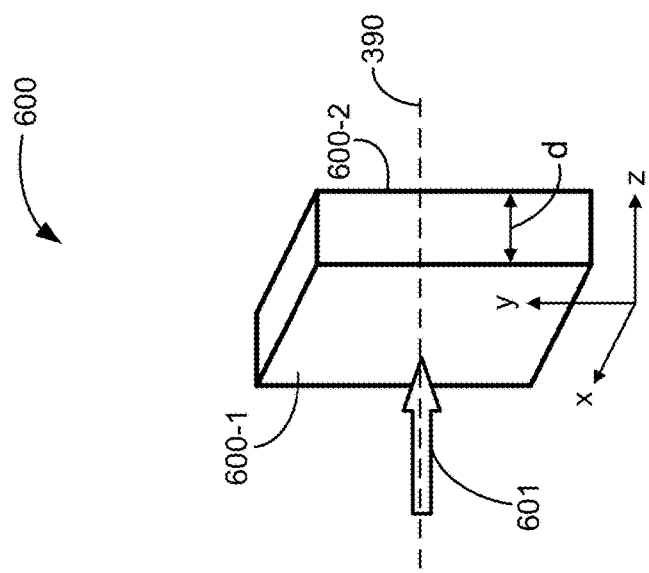

FIG. 6A illustrates a three dimensional view of telecentric PSH optical element 600 with incoming light 601 impinging the lens along the z-axis. telecentric PSH optical element 600 has two opposing surfaces 600-1 and 600-2. In some embodiments, the surfaces 600-1 and 600-2 are substantially flat. Telecentric PSH optical element 600 has thickness, d, along the z-axis.

FIG. 6B illustrates a y-z cross-sectional view of telecentric PSH optical element 600. In some embodiments, telecentric PSH optical element 600 includes photoalignment layer 602 (e.g., a layer including organic or inorganic compounds including photosensitive groups) and helical structures 603 formed of optically anisotropic molecules. Photoalignment layer 602 is formed by adding a layer of photoalignment material (PAM) on one of the surfaces 600-1 and 600-2. The PAM layer is then exposed to an alignment light (e.g., linearly polarized light) with a desired intensity and incident angle. The alignment light is gradually scanned over the layer of PAM while rotating polarization of the alignment light. The alignment light creates a cycloidal pattern on the layer of PAM (e.g., cycloidal patterns are explained below in FIG. 6E). After preparation of photoalignment layer 602, a layer of optically anisotropic molecules is applied onto photoalignment layer 602 forming helical structures 603. The cycloidal pattern of photoalignment layer 602 defines the orientation of helical structures 603. After formation of helical structures 603, the layer of optically anisotropic molecules is firmed (e.g., fixed, set, or cured) to form a polymer. In some embodiments, the firming includes thermal or UV curing. In some embodiments, helical structures 603 are formed of liquid crystals, such as cholesteric liquid crystals. Helical structures 603 are aligned along helical axes 604 which is substantially parallel to the z-axis (e.g., helical axes 604 and the z-axis form an angle less than 1 degree). In some embodiments, the optically anisotropic molecules are rotated in a same rotational direction (forming a helical twist) about helical axes 604 throughout the optically transparent substrate. Helical structures 603 define helical pitch 605, used herein to refer to a distance between two adjacent optically anisotropic molecules of a same helical structure that have the same orientation.

Telecentric PSH optical element 600 may change or affect the direction and/or polarization of light in a specific wavelength range (e.g., telecentric PSH optical element 600 is wavelength selective) and having a first circular polarization (e.g., telecentric PSH optical element 600 is polarization selective) that has the same handedness as the helical structures in telecentric PSH optical element 600. Telecentric PSH optical element 600 does not change or affect the direction and polarization of light outside the specific wavelength range and/or having a polarization different from (including light having a second polarization opposite to) the handedness of the helical structures in telecentric PSH optical element 600. When first light having the first circular polarization and a wavelength in the specific wavelength range impinges upon a surface (e.g., surface 600-1 or 600-2) of telecentric PSH optical element 600 with an incident angle within a first predetermined angular range, telecentric PSH optical element 600 interacts with the first light and changes the direction of the first light (e.g., redirects, reflects, refracts, diffracts, focuses the first light). While interacting with the first light, a transmissive PSH changes the polarization of the first light (e.g., from RCP to LCP or vice versa), whereas a reflective PSH does not change the polarization of the first light (e.g., RCP light is reflected as RCP light). On the other hand, telecentric PSH optical element 600 is configured to transmit second light that has a wavelength outside the specific wavelength range associated with telecentric PSH optical element 600 and/or having a circular polarization with handedness opposite to the helical structures in telecentric PSH optical element 600 without changing its direction or polarization. For example, a transmitting PSH changes polarization of first light from RCP light to LCP light and simultaneously changes the direction of the first light while transmitting the second light (LCP) without changing its polarization or direction. As another example, a reflective PSH lens changes the direction of the first light (RCP) without changing its polarization while transmitting second light (LCP) without changing its direction or polarization. In contrast, a conventional reflective lens or a mirror changes the polarization of polarized light when reflecting the light. In some embodiments, in addition to being selective based on the circular polarization of light, a PSH lens is also wavelength selective and/or selective based on incident angle of the light. Optical properties of telecentric PSH optical element 600 (e.g., reflective or transmissive) are based on an orientation of the helical axes and/or a helical pitch of a liquid crystal.

Further, for light originating from a distance that is within a predetermined distance range, telecentric PSH optical element 600 is configured to receive and redirect a portion of the light having the first circular polarization, wavelengths within the specific wavelength range, and incident angles within the first predetermined angular range, in the same direction (e.g., the redirected light form a same angle with respect to an optical axis of telecentric PSH optical element 600), forming a substantially collimated beam (e.g., the beam has a divergence or angular spread that is no greater than 3 degrees).

Figure 6D:
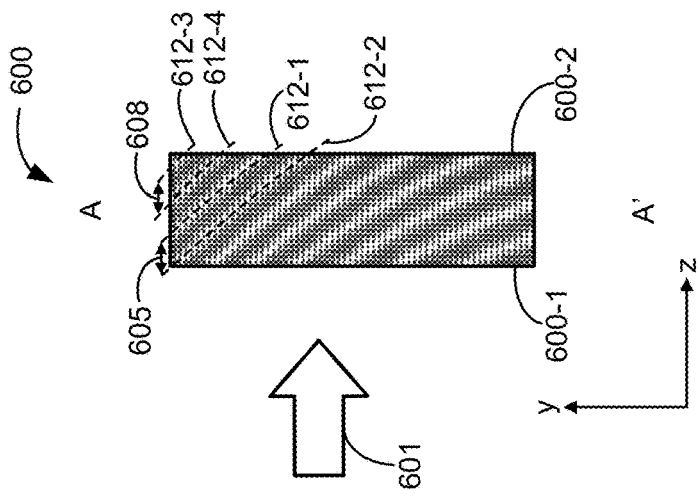
Figure 6C:
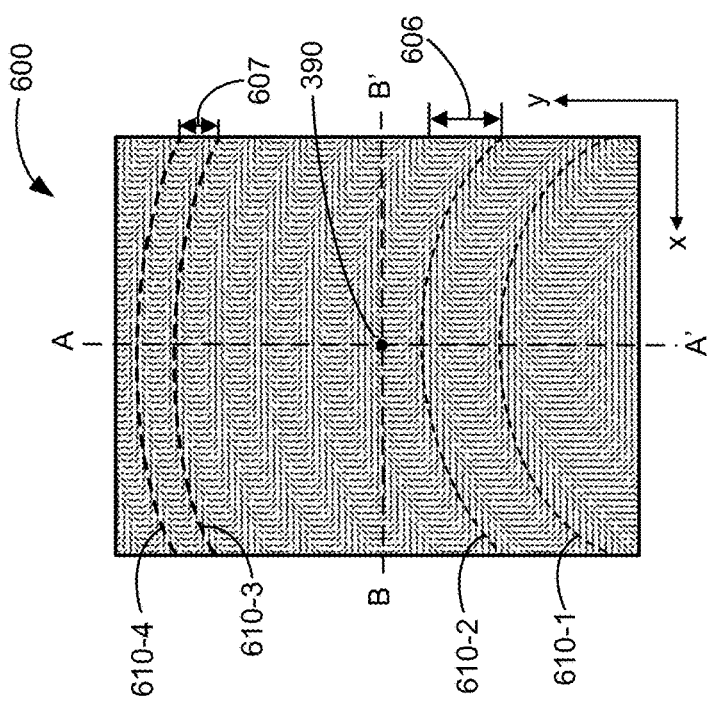

FIG. 6C is a cross-sectional view of an x-y plane of telecentric PSH optical element 600. The helical structures 603 in telecentric PSH optical element 600 form curved lateral fringes (e.g., lateral fringes 610-1 and 610-2) that correspond to adjacent optically anisotropic molecules in the x-y plane that have the same alignment. A lateral pitch 606 is defined by the distance between two adjacent lateral fringes (e.g., lateral fringes 610-1 and 610-2). In some embodiments, the lateral pitch may vary. For example, FIG. 6D shows a first lateral pitch 606 between lateral fringes 610-1 and 610-2 and a second lateral pitch 607, different from the first lateral pitch 606, between lateral fringes 610-3 and 610-4.

FIG. 6C also shows two reference lines, AA' and BB'. The reference lines, AA' and BB', intersect with the optical axis and are perpendicular to each other and the optical axis. In some embodiments, one or more of the curved lateral fringes are not symmetrical with respect to at least one of the two reference lines across the surface. In some embodiments, as shown in FIG. 6C, each of the curved lateral fringes is symmetrical with respect to a first reference line (e.g., reference line AA') across the surface but is not symmetrical with respect to the other reference line (e.g., reference line BB' or a line that is parallel to reference line BB'). In some embodiments, each of the curved lateral fringes is not symmetrical with respect to both reference lines, AA' and BB'.

FIG. 6D is a cross-sectional view of a y-z plane of telecentric PSH optical element 600 across reference line AA' illustrated in FIG. 6C. The helical structures 603 in telecentric PSH optical element 600 form curved helical fringes (e.g., helical fringes 612-1 and 612-2) that correspond to adjacent optically anisotropic molecules in the y-z plane that have the same alignment. The helical pitch 605 is defined by the distance between two adjacent helical fringes (e.g., helical fringes 612-1 and 612-2). In some embodiments, the helical pitch may vary. For example, FIG. 6D shows a first helical pitch 605 between helical fringes 612-1 and 612-2 and a second helical pitch 608, different from the first helical pitch 605, between helical fringes 612-3 and 612-4. The helical fringes are tilted and curved with respect to an material surface (e.g., surface 600-1 or 600-2) of telecentric PSH optical element 600.

Figure 6E:
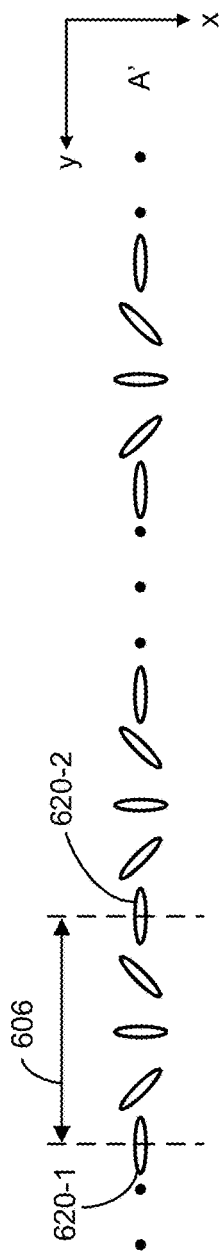

FIG. 6E illustrates an exemplary example of the orientation of optically anisotropic molecules on a photoalignment layer (e.g., photoalignment layer 602). FIG. 6E shows two adjacent optically anisotropic molecules that have the same orientation (e.g., optically anisotropic molecules 620-1 and 620-2). The distance between optically anisotropic molecules 620-1 and 620-2 define the lateral pitch 606, also shown in FIG. 6C.

Figure 6F:
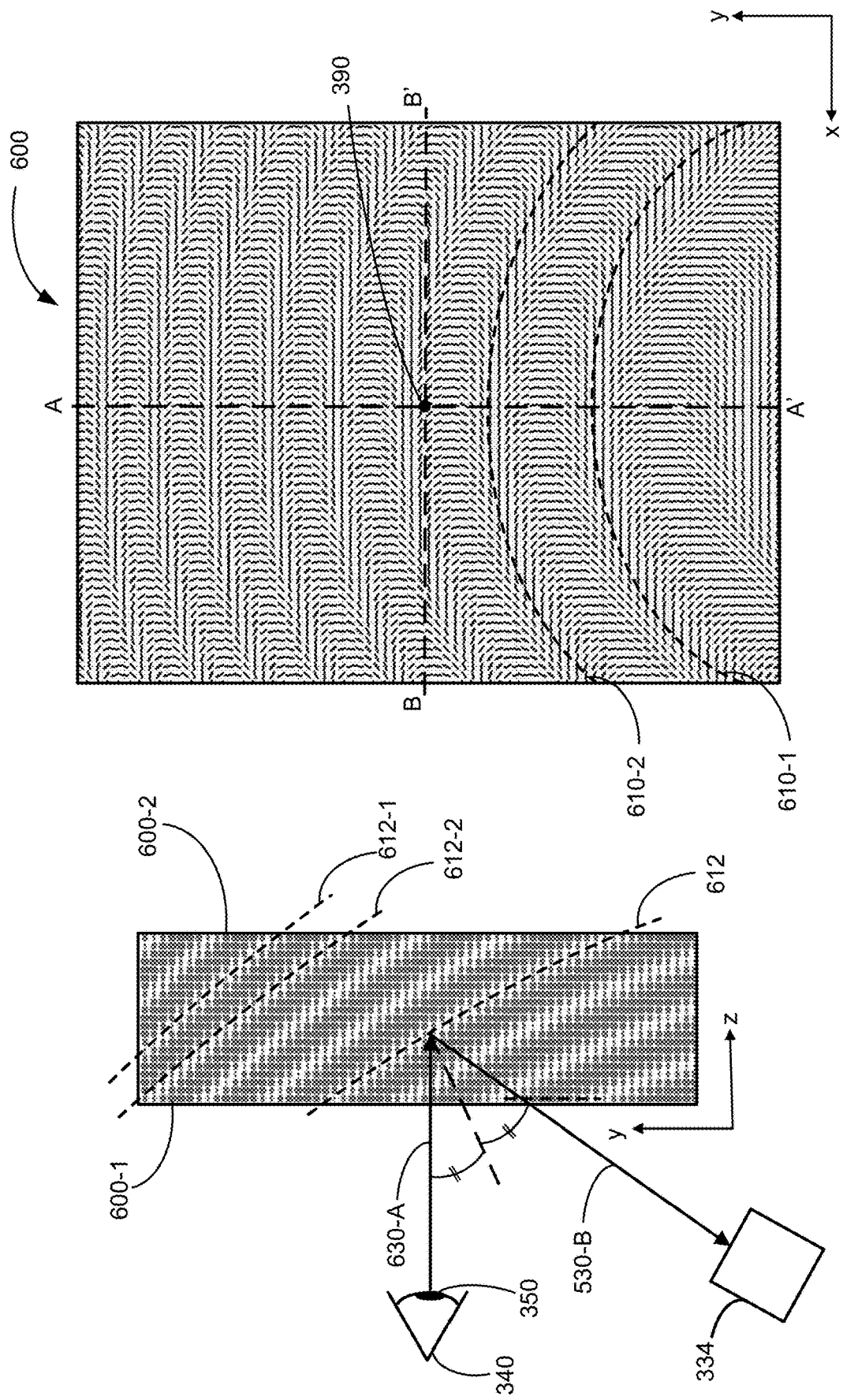
FIGS. 6F-6G illustrate an exemplary example of a telecentric polarization sensitive hologram in an eye-tracking assembly in accordance with some embodiments.

FIG. 6F illustrates an exemplary example of telecentric PSH optical element 600 in an eye-tracking assembly (e.g., telecentric eye-tracking assembly 400, 402) in accordance with some embodiments. Telecentric PSH optical element 600 has curved helical fringes 612 that are tilted with respect to a surface of telecentric PSH optical element 600, in this example, surface 600-1. The tilt of helical fringes 612-1 and 612-2 allow telecentric PSH optical element 600 to redirect (e.g., steer) light along the x-axis. The curvature of helical fringes 612-1 and 612-2 allow telecentric PSH optical element 600 to receive light propagating from a point (e.g., a point on the eye 340) and redirect the light as a substantially collimated beam (e.g., the beam has a divergence or angular spread no greater than 3 degrees). In particular, the curvature(s) of the helical fringes collimates the beam along the y-direction. Thus, the curvature(s) of the helical fringes 612 contributes to the optical power and magnification of telecentric PSH optical element 600. For example, light 630-A, reflected off a location of the eye 340 is incident upon telecentric PSH optical element 600 with incident angles within the first predetermined angular range, is redirected as a substantially collimated beam (e.g., the beam has a divergence or angular spread that is no greater than 3 degrees) propagating along an off-axis position along the y-axis as light 630-B. In this example, the tilt of the helical fringes 612 allow light 630-A to be redirected to the left or right of the eye 340, along the x-axis, and the curvature of the fringes allow the diverging incident light to be substantially collimated (e.g., the light has a divergence or angular spread that is no greater than 3 degrees).

Telecentric PSH optical element 600 also has curved lateral fringes 610-1 and 610-2 which are curved with respect to a surface of telecentric PSH optical element 600. In some embodiments, lateral fringes 610-1 and 610-2 may also be tilted with respect to a surface of telecentric PSH optical element 600. The tilt of lateral fringes 610-1 and 610-2 allow telecentric PSH optical element 600 to redirect (e.g., steer) light along the y-axis. The curvature of the lateral fringes 610-1 and 610-2 allow telecentric PSH optical element 600 to receive light propagating from a point (e.g., a point on the eye 340) and redirect the light as a substantially collimated beam (e.g., the beam has a divergence or angular spread no greater than 3 degrees). In particular, the curvature(s) of the lateral fringes collimates the beam along the x-direction. Thus, the curvature(s) of the lateral fringes 610 contributes to the optical power and magnification of telecentric PSH optical element 600. For example, light 630-A, incident upon telecentric PSH optical element 600 with incident angles within the first predetermined angular range, is redirected as a substantially collimated beam (e.g., the beam has a divergence or angular spread that is no greater than 3 degrees) propagating along an off-axis position along the x-axis as light 630-B. In this example, the lateral fringes 610 allow light 630-A to be redirected above or below the eye 340, along the y-axis, and the curvature of the fringes allow the diverging incident light to be substantially collimated (e.g., the light has a divergence or angular spread that is no greater than 3 degrees).

The combined function of curved lateral fringes 610-1 and 610-2 and curved helical fringes 612-1 and 612-2, each of which can be tilted with respect to a surface of telecentric PSH optical element 600, allows telecentric PSH optical element 600 to redirect light 630-A as light 630-B and substantially collimate light 630-B in two directions (along the x-direction and the y-direction). In some embodiments, as shown in FIG. 6F, detector 334 is located at an off-axis position. In this example, the off-axis position is located along the y-axis and off-axis relative to the x-axis (since helical fringes 612-1 and 612-2 are tilted and lateral fringes 610-1 and 610-2 are not tilted). The combination of curvature(s) of the lateral and helical fringes determines optical power and magnification of the telecentric PSH optical element 600. The combination of tilt(s) of the lateral and helical fringes determines the direction in which incident light is redirected.

Figure 6G:
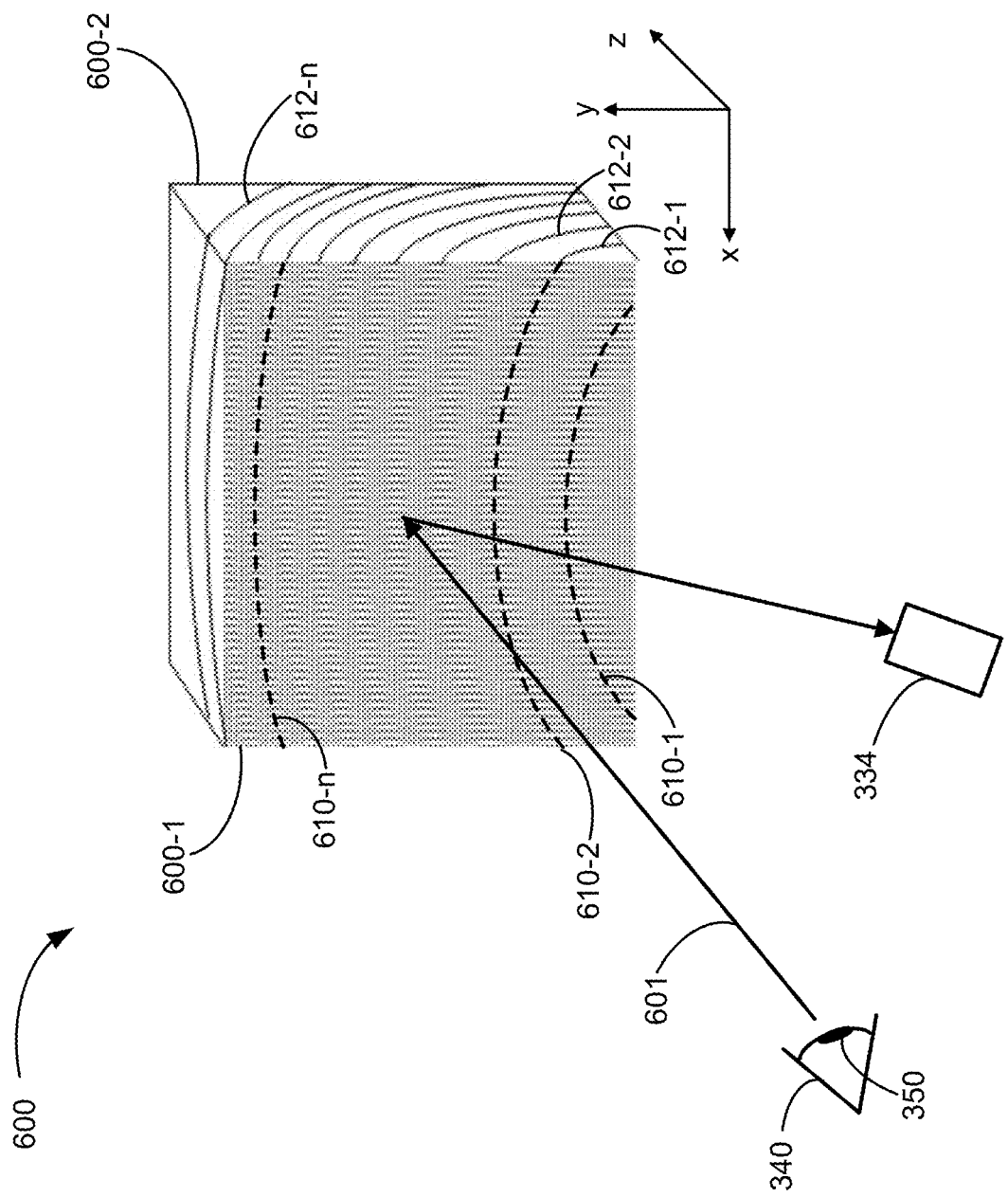

FIG. 6G illustrates a perspective view of telecentric PSH optical element 600 in accordance with some embodiments. In some embodiments, an eye-tracking assembly includes telecentric PSH optical element 600, configured to receive incoming light 601. In some cases, as shown, incoming light 601 includes light (e.g., light 340-A) reflected off an eye 340 from a distance (e.g., first distance 370, second distance 372) within a predetermined distance range. A portion of the incoming light, having a first polarization that corresponds to the handedness of the liquid crystals of telecentric PSH optical element 600, is redirected (e.g., reflected, refracted) toward detector 334. The redirected light is redirected along the y-direction (e.g., downwards) due to the tile of curved lateral fringes (e.g., lateral fringes 610-1, 610-2, 610-n). In this example, the light is not redirected along the x-direction (e.g., left and right) since the curved helical fringes (e.g., helical fringes 612-1, 612-2, 612-n) are not tilted. In some cases, the incoming light may be incident upon telecentric PSH optical element 600 with many different incident angles such that incoming light 601 has a divergence (e.g., an angular spread). The diverging incoming light 601 is redirected as a substantially collimated beam (e.g., having a divergence or angular spread that is no greater than 3 degrees) due to the curvature of the lateral fringes and the helical fringes.

Figure 7A:
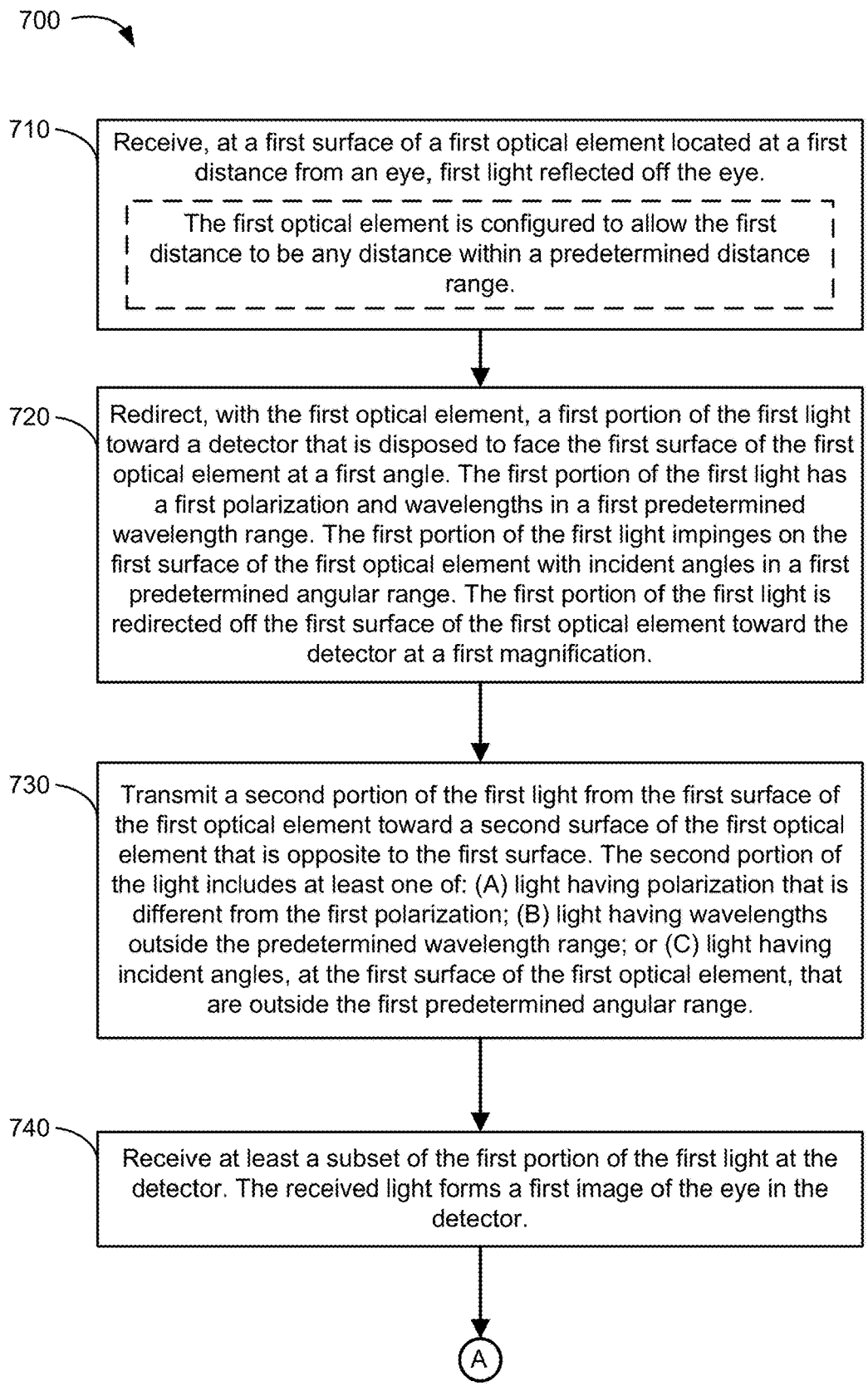
FIGS. 7A-7B illustrate a method of determining a position of a pupil of an eye in accordance with some embodiments.
Figure 7B:
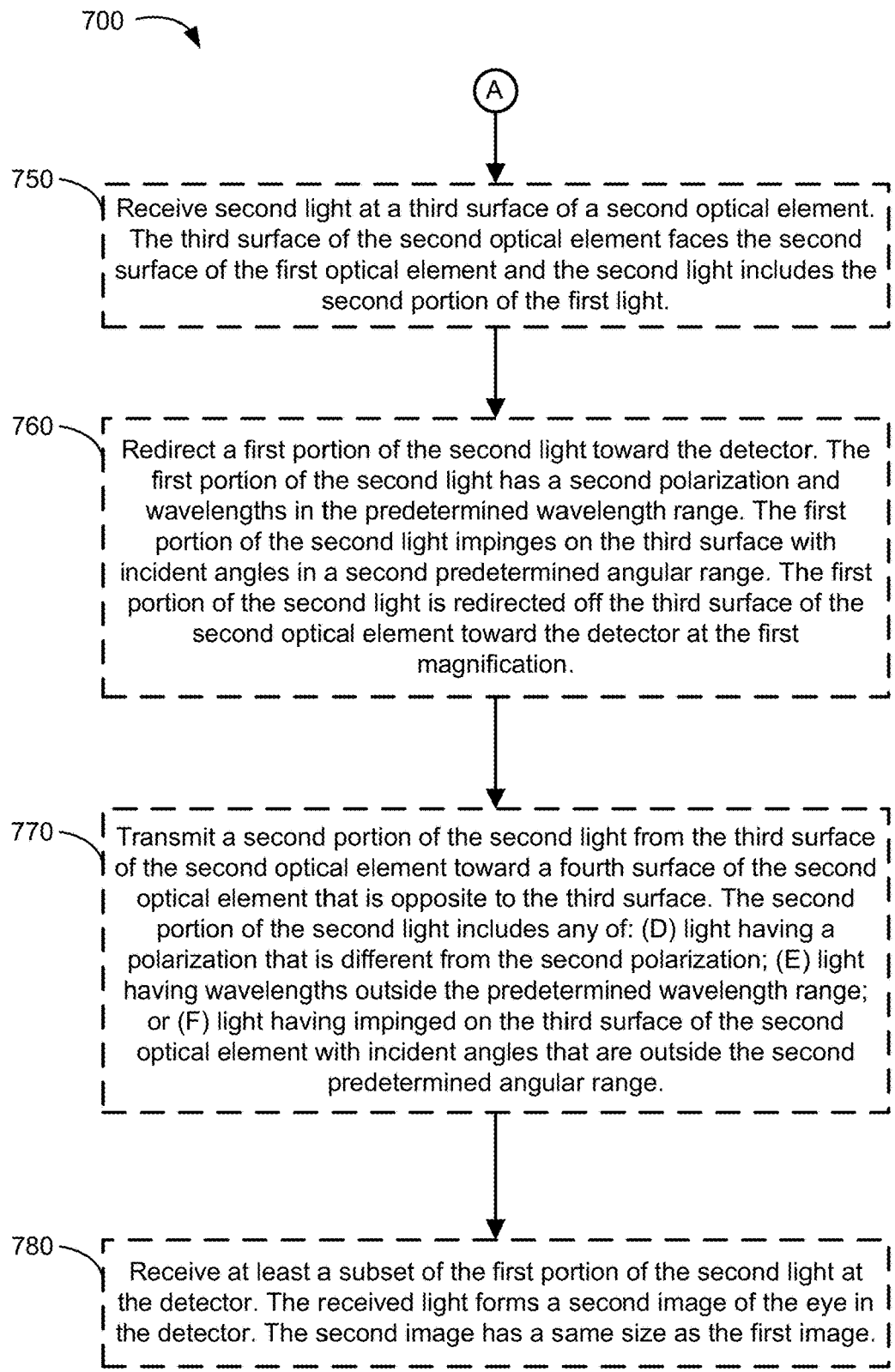

FIGS. 7A-7B illustrate a method 700 of determining a position of a pupil 350 of an eye 340 or a gaze direction of the eye 340 in accordance with some embodiments.

Method 700 includes (step 710) receiving, at a first surface (e.g., first surface 332-1 of first optical element 332) from the eye, first light reflected off the eye (e.g., light 382-A, light 382-A', light 382-A"). In some embodiments, the first optical element is configured to allow the first distance to be any distance within a predetermined distance range (e.g., 10 mm to 25 mm).

Method 700 also includes (step 720) Redirecting a first portion (e.g., light 382-A, light 382-A', light 382-A") of the first light toward a detector (e.g., detector 334) that is disposed to face the first surface at a first angle (e.g., angle ϕ). The first portion of the first light has a first circular polarization (e.g., RCP) and wavelengths in a specific wavelength range. The first portion of the first light impinges on the first surface with incident angles in a specific angular range (e.g., <20 degrees). The first portion of the first light is redirected off the first surface as a first substantially collimated (e.g., having an angular spread that is no greater than 3 degrees) beam (e.g., light 382-B, light 382-B', light 382-B") propagating toward the detector.

The method 700 further includes (step 730) transmitting a second portion (e.g., light 382-C) of the first light from the first surface toward a second surface (e.g., second surface 332-2 of first optical element 332) opposite the first surface along an optical axis of a first optical element (e.g., first optical element 332). The second portion of the first light includes light having polarization that is different from the first circular polarization, light having wavelengths outside the specific wavelength range, and light having impinged on the first surface with incident angles outside the specific angular range (e.g., >20 degrees)

The method 700 also includes (step 740) receiving at least a portion of the first substantially collimated beam at the detector. The received light forms a first image of the eye in the detector.

In some embodiments, method 700 may also include steps 750-780, described below.

Step 750 includes receiving second light (e.g., light 382-C) at a third surface of second optical element (e.g., first surface 333-1 of second optical element 333) facing the second surface (e.g., second surface 332-2 of first optical element 332). The second light includes the second portion of the first light.

Step 760 includes redirecting a first portion (e.g., light 382-E) of the second light toward the detector (e.g., detector 334). The first portion of the second light has a second circular polarization (e.g., LCP) and wavelengths in the specific wavelength range. The first portion of the second light impinges on the third surface of second optical element with incident angles in a second predetermined angular range (e.g., <20 degrees). In some embodiments, the first predetermined angular range and the second predetermined angular range are the same. Alternatively, the first predetermined angular range may be different from the second predetermined angular range. The first portion of the second light is redirected off the third surface of second optical element as a second substantially collimated beam (e.g., with an angular spread no greater than 3 degrees) propagating toward the detector.

Step 770 includes transmitting a second portion of the second light from the third surface toward a fourth surface of second optical element (e.g., second surface 333-2 of second optical element 333) opposite the third surface along an optical axis of a second optical element (e.g., second optical element 333). The second portion of the second light includes light having polarization that is different from the second circular polarization, light having wavelengths outside the specific wavelength range, and light having impinged on the third surface with incident angles outside the second predetermined angular range (e.g., >20 degrees).

Step 780 includes receiving at least a portion of the second substantially collimated beam at the detector. The received light forms a second image of the eye in the detector. The second image overlaps substantially with the first image.

In light of these principles, we now turn to certain embodiments of eye-tracking assemblies.

In accordance with some embodiments, an optical element (e.g., first optical element 332) has a first surface (e.g., first surface 332-1), a second surface (e.g., second surface 332-2) opposite to the first surface, and a layer of optically anisotropic material (e.g., photopolymers, liquid crystals) between the first surface and the second surface. The optical element is configured to receive light (e.g., light 382-A, light 382-A', light 382-A", light 383-A, light 387-A, light 385-A', light 385-A") on the first surface. The light has propagated from a first location that has a first distance (e.g., first distance 370) from the first surface of the optical element (e.g., a principal ray of the incident light forms an angle less than 40 degrees with the optical axis of the optical element). The optical element is also configured to redirect (e.g., reflect, refract, or diffract) a first portion of the light off the first surface of the optical element in an off-axis direction that is neither parallel nor perpendicular to an optical axis (e.g., optical axis 390) of the optical element (e.g., a principal ray of the reflected forms an angle between 20 degrees and 70 degrees with the optical axis of the optical element). For example, a first portion of light 382-A (e.g., light 382-A") is redirected as light 382-B (e.g., light 382-B"). The optical element is also configured to transmit a second portion of the light to the second surface along an optical axis of the optical element (e.g., transmit second portion of light 382-A as light 382-C). The first portion of the light has a first circular polarization (e.g., RCP) and wavelengths in a predetermined wavelength range (e.g., a specific wavelength range). The first portion of the light impinges on the first surface of the optical element with incident angles in a predetermined angular range (e.g., a specific angular range) (e.g., <20 degrees). The first portion of the light is redirected off the first surface of the optical element in the off-axis direction. The second portion of the light includes at least one of: light having polarization that is different from the first circular polarization; light having wavelengths outside the predetermined wavelength range; or light having incident angles; at the first surface of the optical element, outside the predetermined angular range. In some embodiments, the first portion of the light is redirected off the first surface of the optical element as a substantially collimated beam (e.g., having an angular spread that is no greater than 3 degrees) propagating in the off-axis direction.

In some embodiments, the predetermined wavelength range is between 780 nm and 2.5 μm (e.g., near-infrared wavelengths, between 780 nm and 2.5 μm). In some embodiments, the light is near-infrared light. In some embodiments, the light is infrared light. In some embodiments, the optical element is configured to transmit visible light. In some embodiments, the light has the first circular polarization before and after interacting with the optical element.

In some embodiments, the optical element (e.g., first optical element 332) is configured to allow the first distance (e.g., first distance 370) to be any distance within the predetermined distance range.

In some embodiments, the optical element (e.g., first optical element 332) is configured to function as a telecentric reflective lens (e.g., telecentric PSH optical element 600) to redirect incident light having the first polarization (e.g., RCP), wavelength in the predetermined wavelength range, and incident angles within the predetermined angular range (e.g., <40 degrees).

In some embodiments, the optical element includes an optically transparent substrate (e.g., an optically transparent semiconductor substrate) disposed on the first surface (e.g., first surface 332-1) or the second surface (e.g., second surface 332-2) of the first optical element (e.g., first optical element 332). The layer of optically anisotropic material includes photosensitive molecules (e.g., liquid crystals). The photosensitive molecules are arranged in a plurality of helical structures (e.g., helical structures 603) along parallel helical axes (e.g., helical axes 604) such that photosensitive molecules in each of the plurality of helical structures are oriented to form a helical twist corresponding to (e.g., having the same handedness as) the first circular polarization.

In some embodiments, the layer of optically anisotropic material has a first material surface (e.g., surface 600-1) that is proximate to the first surface (e.g., first surface 332-1) of the optical element (e.g., first optical element 332) and a second material surface (e.g., surface 600-2) that is proximate to the second surface (e.g., second surface 332-2) of the optical element. The parallel helical axes extend from the first material surface to the second material surface. The photosensitive molecules (e.g., liquid crystals) are further arranged such that, at each of the first material surface and the second material surface, photosensitive molecules having a same helical orientation form curved fringes (e.g., lateral fringes 610-1, 610-2, 610-*n*) across the each of the first material surface and the second material surface. The fringes are shaped to enable the layer of optically anisotropic material to redirect the first portion (e.g., light 382-A, light 382-A', light 382-A") of the light in the off-axis position. In some embodiments, the fringes are neither parallel nor perpendicular to the first material surface or the second material surface of the optical element.

In some embodiments, the optical element further includes a layer of photopolymers (e.g., photoalignment layer 602) located between the substrate and the layer of optically anisotropic material. The layer of photopolymers has orientations corresponding to orientations of photosensitive molecules at the first material surface or the second material surface (e.g., surface 600-1 or surface 600-2 of telecentric PSH optical element 600).

In some embodiments, the first material surface (e.g., surface 600-1) and the second material surface (e.g., surface 600-2) are parallel to each other. In some embodiments, each of the curved fringes at the first surface is symmetrical with respect to a first virtual line (e.g., reference line AA') across the first surface but is not symmetrical with respect to a second virtual line (e.g., reference line BB') across the surface. The first virtual line (e.g., reference line AA') intersects with and is perpendicular to the optical axis (e.g., optical axis 390). The second virtual line (e.g., reference line BB') intersects with and is perpendicular to the optical axis (e.g., optical axis 390) and the first virtual line (e.g., reference line AA'). In some embodiments, each of the curved fringes at the first surface is asymmetrical with respect to both the first virtual line (e.g., reference line AA') and the second virtual line (e.g., reference line BB') across the first surface.

In some embodiments, a first average distance (e.g., first lateral pitch 606) between first and second adjacent fringes (e.g., lateral fringes 610-1 and 610-2) near one end of the first virtual line (e.g., reference line AA') is larger than a second average distance (e.g., second lateral pitch 607) between third and fourth adjacent fringes (e.g., lateral fringes 610-3 and 610-4) near an opposite end of the first virtual line. The first and second fringes each has a larger average curvature than each of the third and fourth fringes, and the off-axis direction is parallel to a virtual plane formed by the optical axis and the first virtual line.

In accordance with some embodiments, an eye-tracking assembly (e.g., eye-tracking assembly 330) for determining a position of the pupil (e.g., pupil 350) of an eye (e.g., eye 340) or a gaze direction of the eye includes a first optical element (e.g., first optical element 332), and a detector (e.g., detector 334). The first optical element has a first surface (e.g., first surface 332-1), a second surface (e.g., second surface 332-2) opposite to the first surface, and a first layer of optically anisotropic material disposed between the first surface and the second surface. The detector is disposed to face the first surface of the first optical element at an angle (e.g., an optical axis of the detector and an optical axis of the first optical element forms an angle between 20 to 70 degrees). The first optical element is configured to receive light (e.g., light 382-A, light 382-A', light 382-A", light 383-A, light 384-A, light 387-A, light 385-A, light 385-A', light 385-A") on the first surface of the first optical element. The light has propagated from a first location having a first distance (e.g., first distance 370) from the first surface of the optical element. The optical element is also configured to redirect (e.g., reflect, refract, or diffract) a first portion of the light off the first surface of the optical element toward the detector (e.g., in an off-axis direction that is neither parallel nor perpendicular to optical axis 390 of the first optical element 332, a principal ray of the reflected light forms an angle between 20 degrees and 70 degrees with the optical axis of the optical element). For example, a first portion of light 382-A (e.g., light 382-A") is redirected as light 382-B (e.g., light 382-B"). The optical element is also configured to transmit a second portion of the light to the second surface along an optical axis of the optical element (e.g., transmit second portion of light 382-A as light 382-C). The first portion of the light has a first circular polarization (e.g., RCP) and wavelengths in a predetermined wavelength range. The first portion of the light impinges on the first surface of the optical element with incident angles, on the first optical element, in a first predetermined angular range (e.g., <40 degrees) (e.g., a principal ray of the incident light forms an angle less than 40 degrees with the optical axis 390 of the first optical element 332). The second portion of the light includes light having polarization that is different from the first circular polarization, light having wavelengths outside the predetermined wavelength range, and light having incident angles outside the first predetermined angular range.

In some embodiments, the first optical element (e.g., first optical element 332) is configured to allow the first distance to be any distance (including second distance 372) within a predetermined distance range (e.g., 10 mm to 25 mm).

In some embodiments, a portion (e.g., light 382-B) of the first portion of the first light is received by the detector (e.g., detector 334). The portion of the first portion of the first light having impinged on the first surface of the first optical element (e.g., first optical element 332) with incident angles in an angular range (e.g., <10 degrees) that is smaller than the first predetermined angular range.

In some embodiments, the eye-tracking assembly (e.g., eye-tracking assembly 330) also includes a second optical element (e.g., second optical element 333) that has a third surface (e.g., first surface 333-1) facing the second surface (e.g., second surface 332-2) of the first optical element (e.g., first optical element 332), a fourth surface (e.g., second surface 333-2) opposite to the third surface, and a second layer of optically anisotropic material between the third surface and the fourth surface. The second optical element is configured to receive second light (e.g., light 382-C) on the third surface. The second light includes the second portion of the first light. The second optical element is also configured to redirect (e.g., reflect, refract, or diffract) a first portion of the second light toward the detector (e.g., a principal ray of the reflected light forms an angle between 20 degrees and 70 degrees with the optical axis of the second optical element 333) and to transmit a second portion (e.g., light 382-E) of the second light to the fourth surface. The first portion of the second light has a second circular polarization (e.g., LCP) distinct from (e.g., opposite to) the first circular polarization and wavelengths in the predetermined wavelength range. The first portion of the second light impinges on the third surface of the second optical element with incident angles in a second predetermined angular range (e.g., <40 degrees). The first portion of the second light is redirected off the third surface of the second optical element toward detector (e.g., detector 334). The second portion (e.g., light 382-F) of the second light includes any of: light having polarization that is different from the second circular polarization; light having wavelengths outside the predetermined wavelength range; and light having incident angles outside the third angular range. In some embodiments, the second optical element is a telecentric optical element. In some embodiments, the second optical element is a telecentric polarization sensitive hologram (e.g., telecentric PSH optical element 600).

In some embodiments, the second surface (e.g., second surface 322-2) of the first optical element (e.g., first optical element 332) is adjacent to (e.g., touching) the third surface (e.g., first surface 333-1) of the second optical element (e.g., second optical element 333) and the first optical element and the second optical element share a same optical axis (e.g., optical axis 390) (e.g., the first optical axis and the second optical axis coincide with one another).

In some embodiments, a head-mounted device (e.g., display device 500) configured to be mounted near an eye (e.g., eye 340) of a user includes a display system (e.g., display system 530) and the eye-tracking assembly (e.g., eye-tracking assembly 330) as described above. The display system is configured to output image light (e.g., light 380-A) corresponding to one or more images. The display system includes an optical assembly (e.g., optical assembly 320) that is configured to project the image light toward the eye. The first optical element (e.g., first optical element 332) is located adjacent to the optical assembly. In some embodiments, the first optical element is formed on a surface of the optical assembly.

In some embodiments, the display system (e.g., display device 500) is coupled to the eye-tracking assembly (e.g., eye-tracking assembly 330). The display system is configured to adjust the optical assembly (e.g., optical assembly 320) so as to direct the image light (e.g., light 380-A) projected to the eye (e.g., eye 340) based on the position of a pupil (e.g., pupil 350) of the eye, determined by the eye-tracking assembly.

In some embodiments, the head-mounted device (e.g., display device 500) also includes a light source (e.g., illumination source 336) configured to output eye-tracking light (e.g., eye-tracking light 382) to illuminate the eye (e.g., eye 340). In some embodiments, the eye-tracking light is near-infrared light (e.g., between 780 nm and 2.5 μm). In some embodiments, the eye-tracking light is circularly polarized. Alternatively, the eye-tracking light may be unpolarized.

In some embodiments, the first optical element (e.g., first optical element 332) is configured to receive third light (e.g., light 380-B) impinging on the second surface (e.g., second surface 332-2) of the first optical element and to transmit the third light toward the eye (e.g., eye 340). The third light includes one or more of the image light (e.g., light 380-A) and the eye-tracking light (e.g., eye-tracking light 381).

In some embodiments, the image light (e.g., light 380-A) has a polarization different from the first circular polarization or wavelengths outside the predetermined wavelength range. In some embodiments, the image light has a linear polarization. In some embodiments, the image light has wavelength outside the predetermined wavelength range. In some embodiments, the image light has wavelengths in the visible range.

In accordance with some embodiments, a method (e.g., method 700) for determining a position of a pupil (e.g., pupil 350) of an eye (e.g., eye 340) or a gaze direction of the eye, includes receiving, at a first surface (e.g., first surface 332-1) of a first optical element (e.g., first optical element 332), first light (e.g., light 382-A, light 382-A', light 382-A") reflected off the eye. The method also includes redirecting, with the first optical element, a first portion (e.g., light 382-A, light 382-A', light 382-A", light 383-A, light 384-A, light 387-A, light 385-A, light 385-A', light 385-A") of the first light toward a detector (e.g., detector 334) that is disposed to face the first surface of the first optical element at a first angle (e.g., between 20 degrees to 70 degrees) (e.g., a principal ray of the reflected light forms an angle between 20 degrees and 70 degrees with the optical axis of the optical element). For example, first portion of light 382-A (e.g., light 382-A") is redirected by the first optical element as light 382-B (e.g., light 382-B"). The method also includes transmitting a second portion of the first light from the first surface of the first optical element toward a second surface (e.g., second surface 332-2) of the first optical element that is opposite to the first surface (e.g., transmit second portion of light 382-A as light 382-C). The first portion of the first light has a first circular polarization (e.g., RCP) and wavelengths in a predetermined wavelength range. The first portion of the first light impinges on the first surface of the first optical element with incident angles in a first predetermined angular range (e.g., <20 degrees). The first portion of the first light is redirected off the first surface toward the detector. The second portion of the first light includes at least one of: light having polarization that is different from the first circular polarization; light having wavelengths outside the predetermined wavelength range; and light having impinged on the first surface of the first optical element with incident angles outside the predetermined angular range (e.g., >20 degrees). The method further includes receiving at least a subset of the first portion of the first light at the detector. The received light forms a first image of the eye in the detector.

In some embodiments, the method (e.g., method 700) further includes receiving second light (e.g., light 382-C) at a third surface (e.g., first surface 333-1) of a second optical element (e.g., second optical element 333) facing the second surface (e.g., second surface 332-2) of first optical element (e.g., first optical element 332). The second light includes the second portion of the first light. The method also includes redirecting a first portion of the second light toward the detector and transmitting a second portion of the second light from the third surface of the second optical element toward a fourth surface (e.g., second surface 333-2) of the second optical element opposite the third surface along an optical axis of a second optical element (e.g., second optical element 333) (e.g., redirect first portion of light 382-C as light 382-E and transmit second portion of light 392-C as light 382-F). The first portion of the second light has a second circular polarization (e.g., LCP) and wavelengths in the predetermined wavelength range. The first portion of the second light impinges on the third surface of the second optical element with incident angles in a second predetermined angular range (e.g., <20 degrees). In some embodiments, the first predetermined angular range and the second predetermined angular range are the same. Alternatively, the first predetermined angular range may be different from the second predetermined angular range. The first portion of the second light is redirected off the third surface toward the detector. The second portion of the second light includes any of: light having polarization that is different from the second circular polarization, light having wavelengths outside the predetermined wavelength range, and light having impinged on the third surface of the second optical element with incident angles outside the second predetermined angular range (e.g., >20 degrees). The method also includes receiving at least a subset of the first portion of the second light at the detector. The received light forms a second image of the eye in the detector. The second image has a same size as the first image.

Although various drawings illustrate operations of particular components or particular groups of components with respect to one eye, a person having ordinary skill in the art would understand that analogous operations can be performed with respect to the other eye or both eyes. For brevity, such details are not repeated herein.

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. An optical element having a first surface, a second surface opposite to the first surface, and a layer of optically anisotropic material between the first surface and the second surface, wherein the optical element is configured to:
   receive light on the first surface, the light having propagated from a first location having a first distance from the first surface of the optical element;
   redirect a first portion of the light off the first surface of the optical element in an off-axis direction that is neither parallel nor perpendicular to an optical axis of the optical element; and
   transmit a second portion of the light to the second surface, wherein:
      the first portion of the light has a first polarization and wavelengths in a predetermined wavelength range;
      the first portion of the light impinges on the first surface of the optical element with incident angles in a predetermined angular range;
      the second portion of the light includes at least one of:
         light having polarization that is different from the first polarization;
         light having wavelengths outside the predetermined wavelength range; or
         light having incident angles, on the first surface of the optical element, outside the predetermined angular range;
      the optical element includes a substrate disposed on the first surface or the second surface of the optical element;
      the layer of optically anisotropic material includes photosensitive molecules; and
      the photosensitive molecules are arranged in a plurality of helical structures along parallel helical axes, such that photosensitive molecules in each of the plurality of helical structures are oriented to form a helical twist corresponding to the first polarization.

2. The optical element of claim 1, wherein the optical element is configured to allow the first distance to be any distance within a predetermined distance range.

3. The optical element of claim 1, wherein the optical element is configured to function as a telecentric reflective lens to redirect incident light having the first polarization, a wavelength in the predetermined wavelength range, and incident angles within the predetermined angular range.

4. The optical element of claim 1, wherein the layer of optically anisotropic material has a first material surface proximate to the first surface of the optical element and a second material surface proximate to the second surface of the optical element, wherein:
   the parallel helical axes extend from the first material surface to the second material surface;
   the photosensitive molecules are further arranged such that, at each of the first material surface and the second material surface, photosensitive molecules having a same helical orientation form curved fringes across the each of the first material surface and the second material surface; and
   the curved fringes are shaped to enable the layer of optically anisotropic material to redirect the first portion of the light in the off-axis direction.

5. The optical element of claim 4, wherein the optical element further includes a layer of photopolymers located between the substrate and the layer of optically anisotropic material, the layer of photopolymers having orientations corresponding to orientations of photosensitive molecules at the first material surface or the second material surface.

6. The optical element of claim 4, wherein:
   the first material surface and the second material surface are parallel to each other;
   each of the curved fringes is symmetrical with respect to a first virtual line across one of the first material surface and the second material surface, and is not symmetrical with respect to a second virtual line across the one of the first material surface and the second material surface;
   the first virtual line intersects with and is perpendicular to the optical axis; and
   the second virtual line intersects with and is perpendicular to the optical axis and the first virtual line.

7. The optical element of claim 6, wherein:
   a first average distance between first and second adjacent fringes near one end of the first virtual line is larger than a second average distance between third and fourth adjacent fringes near an opposite end of the first virtual line; and
   each of the first and second fringes has an average curvature larger than each of the third and fourth fringes, and the off-axis direction is parallel to a virtual plane formed by the optical axis and the first virtual line.

8. An eye-tracker for determining a position of a pupil of an eye or a gaze direction of the eye, the eye-tracker comprising:
   a first optical element having a first surface, a second surface opposite to the first surface, and a first layer of optically anisotropic material between the first surface and the second surface; and
   a detector disposed to face the first surface of the first optical element at an angle;
   the first optical element being configured to:
      receive first light on the first surface of the first optical element, the first light having propagated from a first location having a first distance from the first surface of the first optical element;
      redirect a first portion of the first light off the first surface of the first optical element in a first direction toward the detector; and
      transmit a second portion of the first light to the second surface of the first optical element, wherein:
         the first portion of the first light has a first polarization and wavelengths in a predetermined wavelength range;

the first portion of the first light impinges on the first surface of the first optical element with incident angles in a first predetermined angular range;

the second portion of the first light includes at least one of:
  light having polarization that is different from the first polarization;
  light having wavelengths outside the predetermined wavelength range; or
  light having incident angles, on the first surface of the first optical element, outside the first predetermined angular range;

the optical element includes a substrate disposed on the first surface or the second surface of the optical element;

the layer of optically anisotropic material includes photosensitive molecules; and the photosensitive molecules are arranged in a plurality of helical structures along parallel helical axes, such that photosensitive molecules in each of the plurality of helical structures are oriented to form a helical twist corresponding to the first polarization.

9. The eye-tracker of claim 8, wherein the first optical element is configured to allow the first distance to be any distance within a predetermined distance range.

10. The eye-tracker of claim 8, wherein a subset of the first portion of the first light is received by the detector, the subset of the first portion of the first light having impinged on the first surface of the first optical element with incident angles in an angular range smaller than the first predetermined angular range.

11. The eye-tracker of claim 8, further comprising:
a second optical element having a third surface facing the second surface of the first optical element, a fourth surface opposite to the third surface, and a second layer of optically anisotropic material between the third surface and the fourth surface, wherein the second optical element is configured to:
  receive second light on the third surface of the second optical element, the second light including the second portion of the first light;
  redirect a first portion of the second light toward the detector; and
  transmit a second portion of the second light to the fourth surface of the second optical element, wherein:
    the first portion of the second light has a second polarization distinct from the first polarization and wavelengths in the predetermined wavelength range;
    the first portion of the second light impinges on the third surface of the second optical element with incident angles in a second predetermined angular range; and
    the second portion of the second light includes at least one of:
      light having polarization that is different from the second polarization;
      light having wavelengths outside the predetermined wavelength range; or
      light having incident angles, on the third surface of the second optical element, outside the second predetermined angular range.

12. The eye-tracker of claim 11, wherein:
the second surface of the first optical element is adjacent to the third surface of the second optical element; and
the first optical element and the second optical element share a same optical axis.

13. A head-mounted device comprising the eye-tracker of claim 8 and configured to mount near an eye of a user, the head-mounted device further comprising a display system configured to output image light corresponding to one or more images, wherein:
the display system includes an optical assembly configured to project the image light toward the eye, and
the first optical element is located adjacent to the optical assembly.

14. The head-mounted device of claim 13, wherein the display system is coupled to the eye-tracker and is configured to adjust the optical assembly so as to direct the image light projected to the eye based on the position of a pupil of the eye determined by the eye-tracker.

15. The head-mounted device of claim 13, further comprising a light source configured to output eye-tracking light to illuminate the eye.

16. The head-mounted device of claim 15, wherein:
the first optical element is configured to receive third light impinging on the second surface of the first optical element and to transmit the third light toward the eye; and
the third light includes one or more of the image light and the eye-tracking light.

17. The head-mounted device of claim 13, wherein the image light has at least one of:
a polarization different from the first polarization; or
wavelengths outside the predetermined wavelength range.

18. A method for determining a position of a pupil of an eye or a gaze direction of the eye, the method comprising:
receiving, at a first surface of a first optical element, first light reflected off the eye;
redirecting, with the first optical element, a first portion of the first light toward a detector that is disposed to face the first surface of the first optical element at a first angle;
transmitting a second portion of the first light from the first surface of the first optical element toward a second surface of the first optical element opposite the first surface, wherein:
  the first portion of the first light has a first polarization and wavelengths in a predetermined wavelength range;
  the first portion of the first light impinges on the first surface of the first optical element with incident angles in a first predetermined angular range;
  the second portion of the first light includes at least one of:
    light having polarization that is different from the first polarization;
    light having wavelengths outside the predetermined wavelength range; and
    light having impinged on the first surface of the first optical element with incident angles outside the first predetermined angular range;
  the optical element includes a substrate disposed on the first surface or the second surface of the optical element;
  the layer of optically anisotropic material includes photosensitive molecules; and
  the photosensitive molecules are arranged in a plurality of helical structures along parallel helical axes, such that photosensitive molecules in each of the plurality of helical structures are oriented to form a helical twist corresponding to the first polarization; and receiving at least a subset of the first portion of the first light at the detector, the received light forming a first image of the eye in the detector.

19. The method of claim 18, further comprising:

receiving, at a third surface of a second optical element facing the second surface of the first optical element, second light including the second portion of the first light;

redirecting, with the second optical element, a first portion of the second light toward the detector;

transmitting a second portion of the second light from the third surface of the second optical element toward a fourth surface of the second optical element opposite the third surface, wherein:

the first portion of the second light has a second polarization different from the first polarization and wavelengths in the predetermined wavelength range;

the first portion of the second light impinges on the third surface of the second optical element with incident angles in a second predetermined angular range; and the second portion of the second light includes at least one of:

light having polarization that is different from the second polarization;

light having wavelengths outside the predetermined wavelength range; and light having impinged on the third surface of the second optical element with incident angles outside the second predetermined angular range; and receiving at least a subset of the first portion of the second light at the detector.

* * * * *